United States Patent
Pape et al.

(10) Patent No.: US 7,423,216 B2
(45) Date of Patent: Sep. 9, 2008

(54) DUAL ACTION SEALING GASKET AND USE THEREOF IN AN ELECTRICAL HOUSING ASSEMBLY

(75) Inventors: Robert Pape, Winona, MN (US); Larry E. Tiedemann, Winona, MN (US); Theodore T. Von Arx, La Crescent, MN (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 53 days.

(21) Appl. No.: 11/337,339

(22) Filed: Jan. 23, 2006

(65) Prior Publication Data

US 2007/0169953 A1 Jul. 26, 2007

(51) Int. Cl.
*H02G 3/04* (2006.01)

(52) U.S. Cl. .................... 174/50; 174/17 CT; 174/358; 174/135; 16/2.1; 16/2.2; 277/910

(58) Field of Classification Search ............. 174/17 CT, 174/18, 351, 668, 377, 480, 506, 650, 651, 174/660, 669, 135, 137 R, 152 R, 153 G, 174/152 G, 358, 370, 366, 652, 561; 219/245; 16/2.1, 2.2; 439/271; 277/606, 312, 910, 277/935, 615, 625; D13/269; 264/250
See application file for complete search history.

(56) References Cited

U.S. PATENT DOCUMENTS

| | | | | |
|---|---|---|---|---|
| 2,454,567 A | * | 11/1948 | Pierson, Jr. ................. | 174/351 |
| 2,796,457 A | * | 6/1957 | Stinger ...................... | 174/351 |
| 4,579,354 A | * | 4/1986 | Vassallo et al. ............. | 277/615 |
| 4,818,209 A | * | 4/1989 | Petersson et al. ............ | 277/615 |
| D323,024 S | * | 1/1992 | Petersson et al. ........... | D23/269 |
| 5,574,254 A | * | 11/1996 | Mori et al. .................. | 174/561 |
| 5,811,728 A | * | 9/1998 | Maeda ....................... | 174/652 |
| 5,942,728 A | * | 8/1999 | Chen .......................... | 174/652 |
| 6,069,317 A | * | 5/2000 | Wagganer ................... | 174/650 |
| 6,277,315 B1 | * | 8/2001 | H.ang.llstedt et al. ....... | 264/250 |
| 6,455,768 B2 | * | 9/2002 | Negishi .................. | 174/17 CT |
| 6,899,354 B2 | * | 5/2005 | Lanteigne et al. ........... | 277/606 |
| 7,140,618 B2 | * | 11/2006 | Valls, Jr. ..................... | 277/625 |
| 2002/0040802 A1 | * | 4/2002 | Yasuda et al. ............. | 174/65 G |

* cited by examiner

*Primary Examiner*—Angel R Estrada
(74) *Attorney, Agent, or Firm*—Brinks Hofer Gilson & Lione

(57) ABSTRACT

A gasket is provided that includes a first sealing portion defining an angled profile and a second sealing portion. A plurality of beads are disposed along the angled profile of the first sealing portion, and a plurality of ribs are disposed along the second sealing portion, thus providing a dual action sealing gasket. The gasket is preferably employed in an electrical housing assembly for a power controller system, wherein the housing assembly comprises a case having an open end, a cover for closing the open end of the case, and a mounting collar disposed around the case for mounting the case to a panel. The gasket is secured to the case proximate the open end such that when the cover is mounted to the open end of the case, the plurality of beads are elastically deformed by the cover and the plurality of ribs are compressed against the panel.

32 Claims, 29 Drawing Sheets

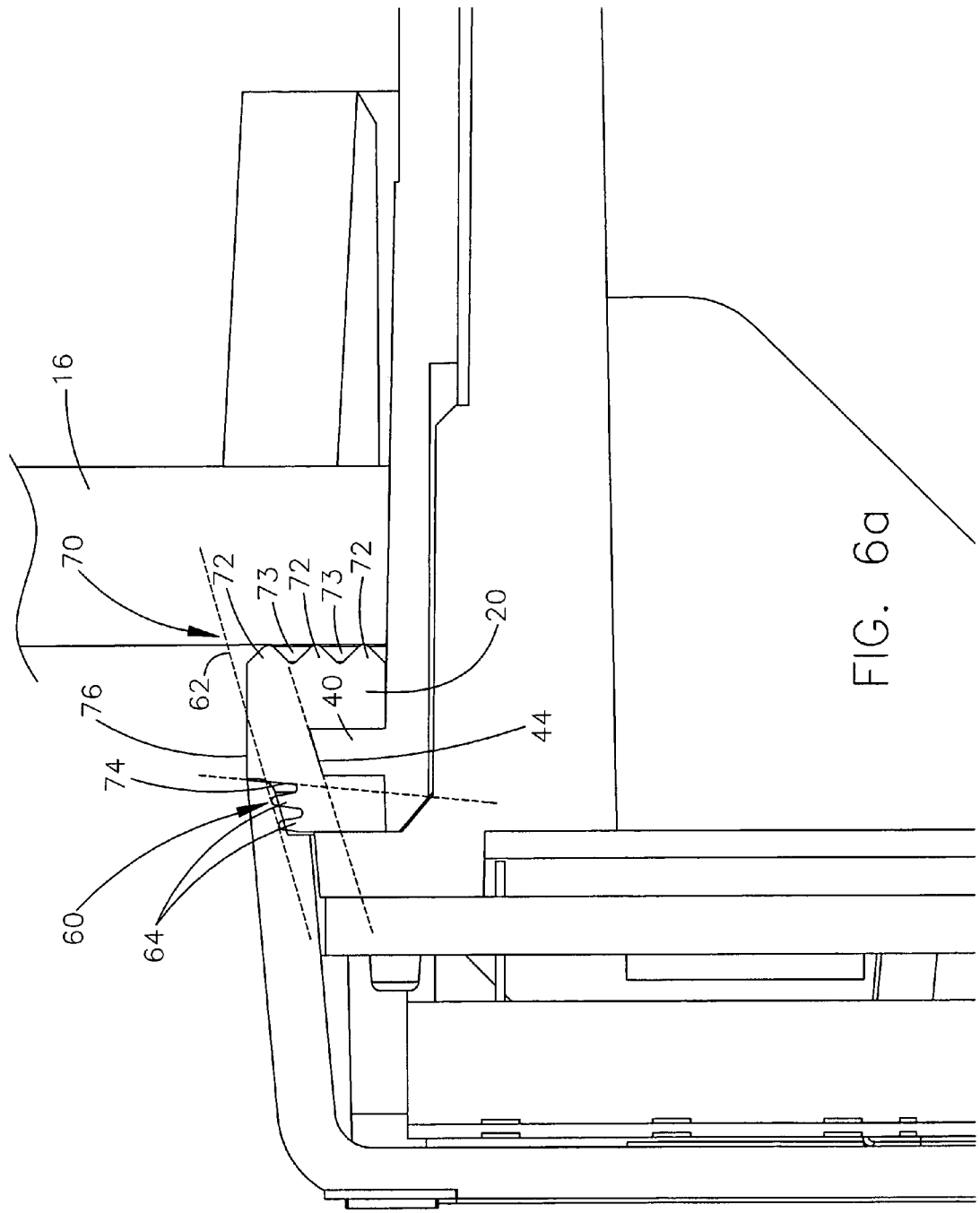

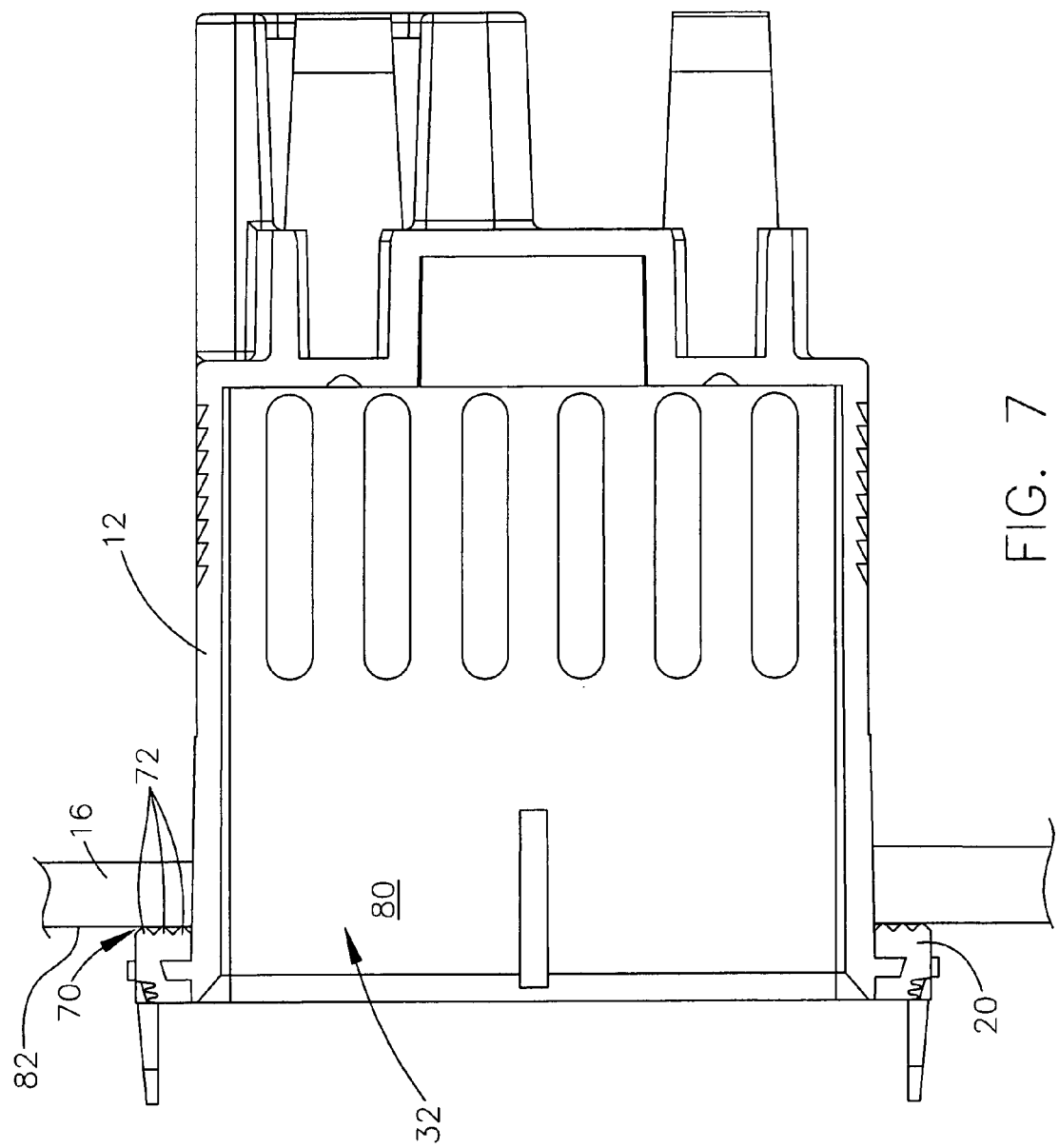

DUAL ACTION SEALING GASKET AND USE THEREOF IN AN ELECTRICAL HOUSING ASSEMBLY

FIELD

The present invention relates generally to sealing gaskets, and more particularly to sealing gaskets used in the mounting of electrical assemblies to panels to prevent moisture from damaging electrical components disposed within enclosures of the electrical assemblies.

BACKGROUND

The statements in this section merely provide background information related to the present disclosure and may not constitute prior art.

A power controller system generally includes a number of electrical enclosure assemblies mounted to a panel, wherein a plurality of electrical and electronic components are disposed within individual enclosures. The enclosure is commonly mounted to the panel on an interior portion, and a cover (or a "bezel" as commonly referred to in the art) is placed over an open end of the enclosure to cover the electrical and electronic components on an exterior portion of the panel. Such a construction often requires the sealing of interfaces between the panel and each of the components of the enclosure assembly, i.e. the bezel on the exterior of the panel and the enclosure on the interior of the panel, to prevent outside moisture from entering the enclosure and possibly damaging the electric and electronic components.

In some electrical applications, the sealing must meet requirements of the National Electrical Manufacturers Association (NEMA), and more specifically NEMA Standard 250, "Enclosures for Electrical Equipment (1000 volts Maximum)." A conventional NEMA sealing arrangement generally requires a sealing member, one of which is commonly referred to as a "NEMA 4X panel gasket," for the interface between the bezel and the panel. One disadvantage of this conventional sealing arrangement is that when the bezel is removed for maintenance purposes, the sealing member becomes dislodged and is often lost or damaged, thus requiring frequent replacement. Another disadvantage is that a relatively large force is often required to properly install the sealing member between the panel and an external component, (e.g., the bezel), to achieve a proper seal. With such large forces, the sealing members often undergo plastic deformation, become brittle, and thus once removed often fail and cannot be re-used.

Additionally, many of the conventional NEMA sealing arrangements require multiple sealing members for a single electrical enclosure installation, depending on the configuration of the external components. The sealing members are also typically secured between the external component and the panel by way of a plurality of mechanical fasteners, which are commonly accessible only from the interior of the panel. The use of multiple mechanical fasteners also results in a somewhat tedious process of installation and removal. Accordingly, a plurality of separate parts are required for a typical electrical enclosure installation, thus increasing the complexity of the installation and also increasing the probability that the separate parts will become lost and/or damaged.

SUMMARY

In one preferred form, a housing assembly is provided that comprises a case having an open end, and a gasket secured to the case proximate the open end. The gasket comprises a first sealing portion defining an angled profile and a plurality of beads disposed along the angled profile, and a second sealing portion defining a plurality of ribs. The plurality of beads are elastically deformed by a cover to provide a seal at the first sealing portion, and the plurality of ribs are compressed against the panel to provide a seal at the second sealing portion.

In another preferred form, a housing assembly is provided that comprises a case having an open end, and a cover for closing the open end of the case. The cover includes an angled periphery surface, and a mounting collar is disposed around the case for mounting the case to a panel. A gasket is secured to the case proximate the open end, wherein the gasket comprises a first sealing portion opposed to the angled periphery surface of the cover. The first sealing portion defines an angled profile and a plurality of beads disposed along the angled profile. The gasket also comprises a second sealing portion opposed to the panel and defining a plurality of ribs, wherein when the cover is mounted to the open end of the case, the plurality of beads are elastically deformed by the cover and the plurality of ribs are compressed against the panel.

In yet another form, a gasket is provided that comprises a first sealing portion defining an angled profile and a second sealing portion. A plurality of beads are disposed along the angled profile of the first sealing portion, and a plurality of ribs are disposed along the second sealing portion.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

The present invention will become more fully understood from the detailed description and the accompanying drawings, wherein:

FIG. 6a is an enlarged cross-sectional view, taken from detail B of FIG. 4, illustrating a gasket constructed in accordance with the teachings of the present disclosure;

FIG. 7 is a cross-sectional view illustrating a case being inserted through a panel in accordance with the teachings of the present disclosure;

Corresponding reference numerals indicate corresponding parts throughout the several views of the drawings.

DETAILED DESCRIPTION

Figure 1:
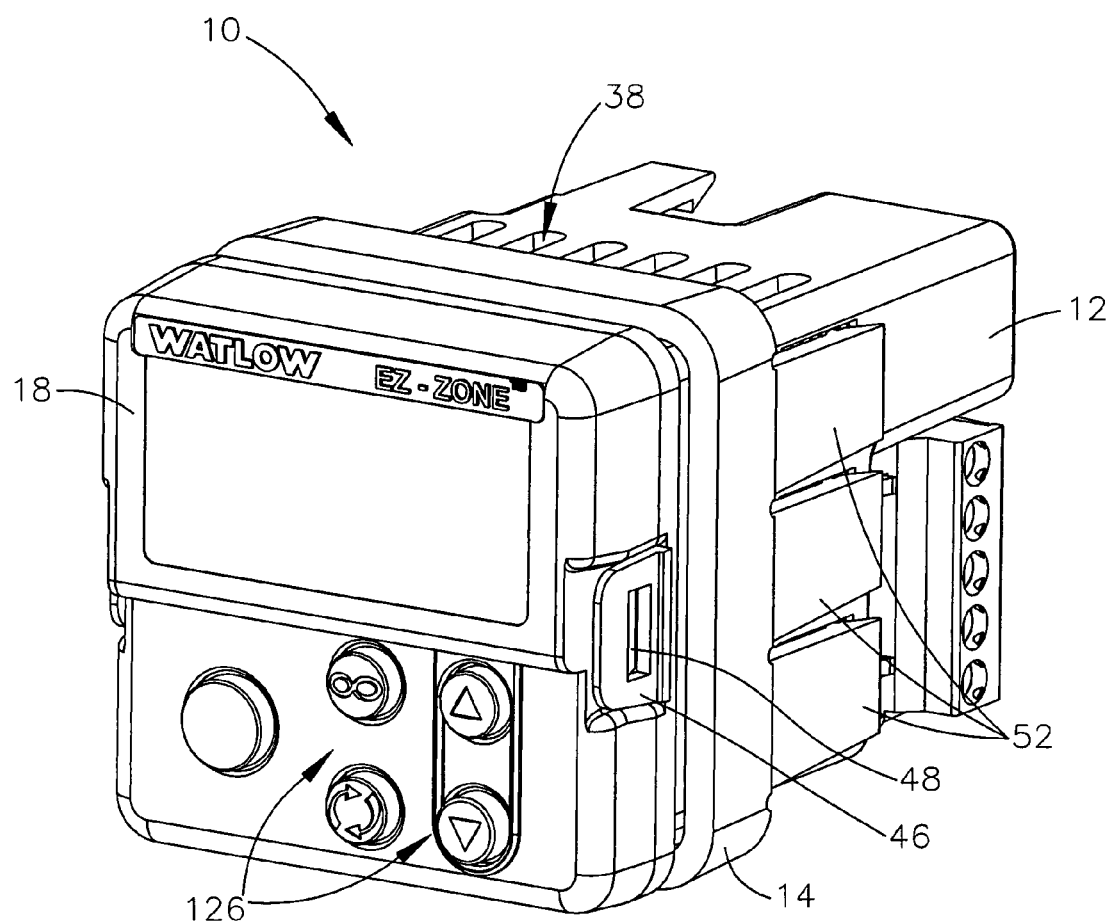
FIG. 1 is a perspective view of a housing assembly constructed in accordance with the teachings of the present disclosure.

The structure and function of various housing assemblies and gaskets in accordance with the teachings of the present disclosure are now described in greater detail. The following description of the illustrated examples is merely exemplary in nature and is in no way intended to limit the invention, its application, or uses.

Referring to FIGS. 1 through 5, a housing assembly in accordance with the teachings of the present disclosure is illustrated and generally indicated by reference numeral 10. The housing assembly 10 comprises a case 12 for enclosing electrical components therein, a mounting collar 14 for securing the case to a panel 16 (shown in FIGS. 4 and 5), a cover 18, and a gasket 20 disposed between the panel 16 and the cover 18 to prevent moisture from entering the case 12 and possibly damaging the electrical components.

The case 12 preferably defines a square shape as shown and includes a closed end 30 (FIG. 4) disposed on an interior side of the panel 16 and an open end 32 disposed proximate an exterior of the panel 16. The case 12 further comprises side walls 34 extending between the closed end 30 and the open end 32. An end wall 36 is provided adjacent the closed end 30 of the case 12 for supporting the various electrical components and their connections to other system components (not shown). Additionally, at least one of the side walls 34 preferably comprises openings 38 to allow dissipation of heat generated from the electrical components to the exterior of the case 12. Although the case 12 is illustrated as a square shape, it should be understood that other shapes such as rectangular, circular, elliptical, and other polygonal shapes may also be employed while remaining within the scope of the present invention.

Figure 2:
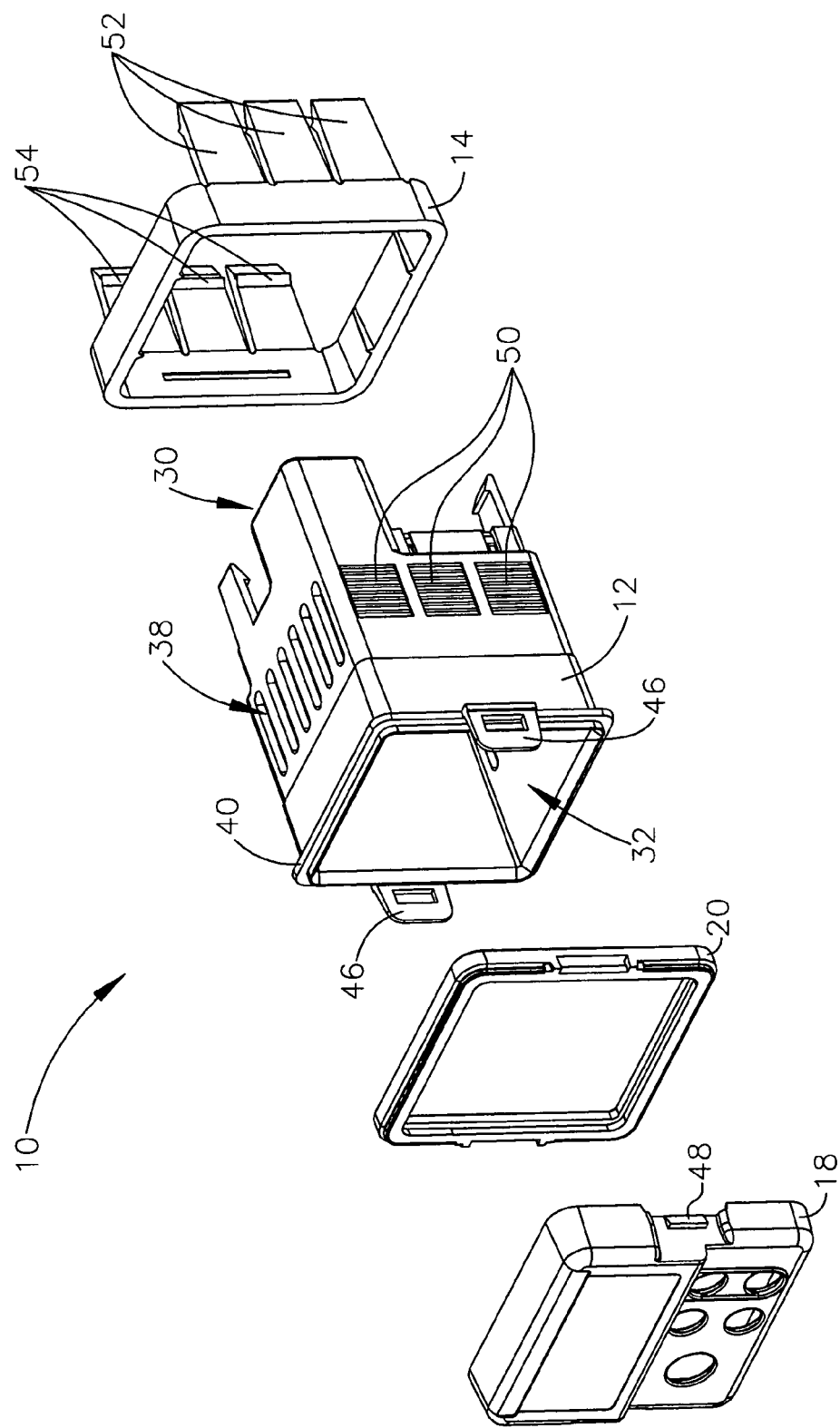
FIG. 2 is an exploded perspective view of the housing assembly in accordance with the teachings of the present disclosure.
Figure 3:
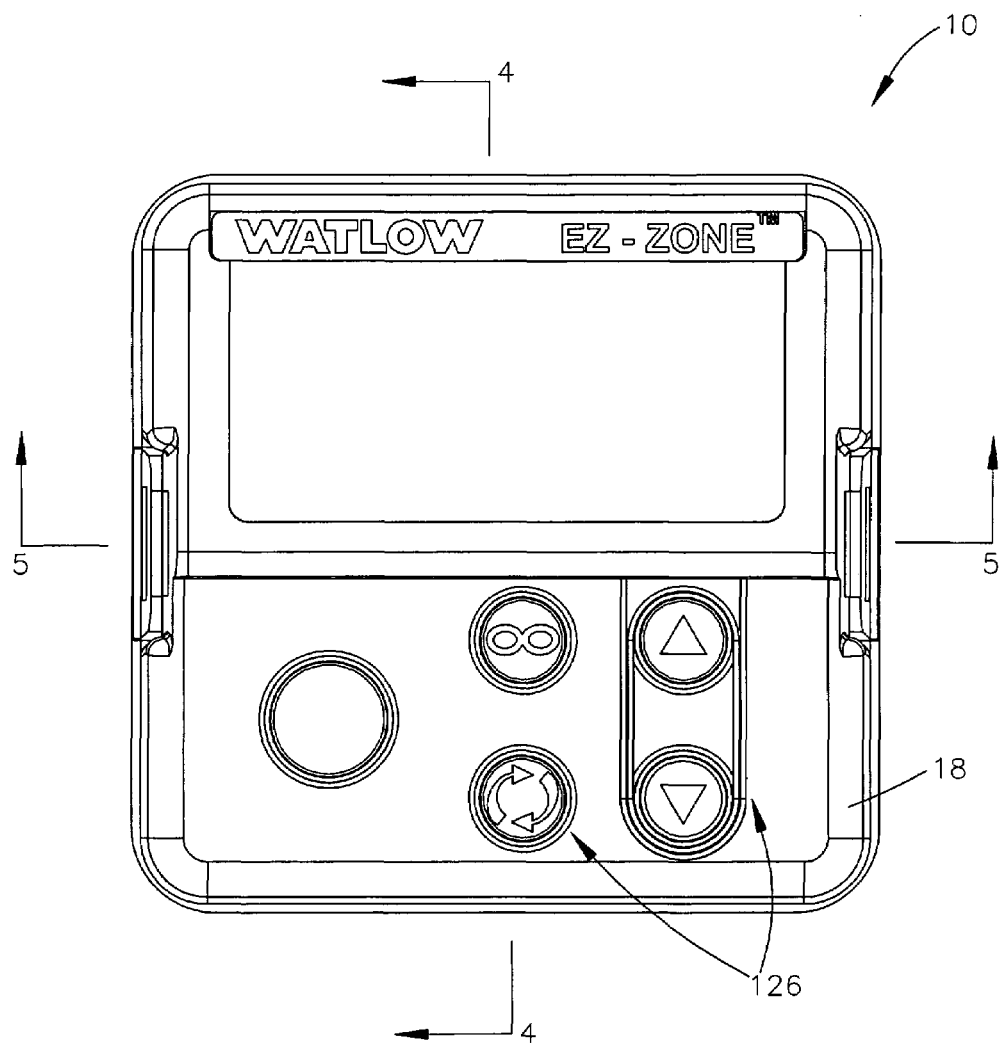
FIG. 3 is a front view of the housing assembly in accordance with the teachings of the present disclosure.
Figure 4:
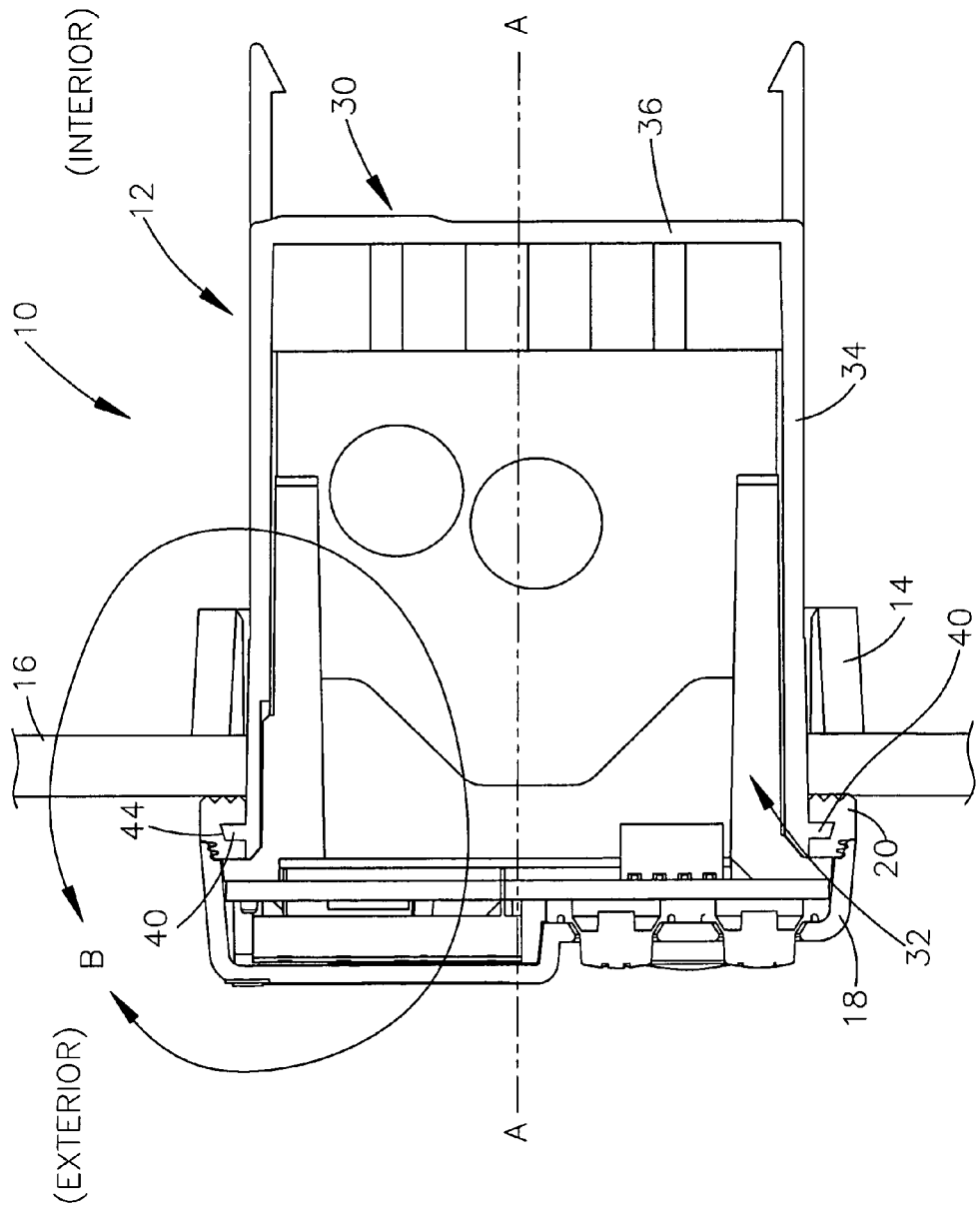
FIG. 4 is a cross-sectional view, taken along line 4-4 of FIG. 3, of the housing assembly mounted to a panel in accordance with the teachings of the present disclosure.
Figure 5:
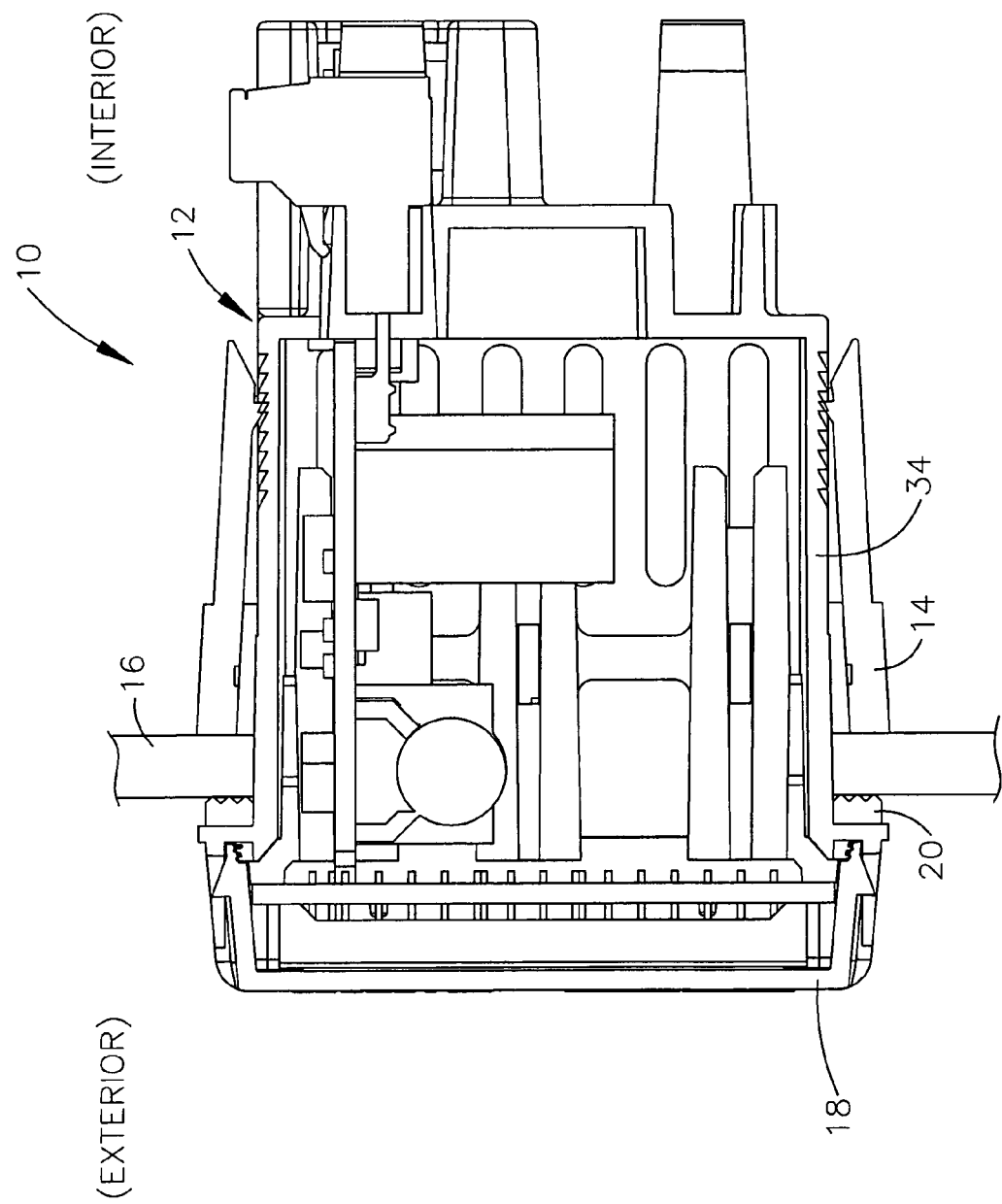
FIG. 5 is a cross-sectional view, taken along line 5-5 of FIG. 3, of the housing assembly mounted to a panel in accordance with the teachings of the present disclosure

As shown in FIGS. 2 and 4, the case 12 further comprises a flange 40 disposed around the open end 32, which preferably extends substantially perpendicular to the side walls 34. The gasket 20 is preferably secured to the flange 40 as shown such that the flange 40 is embedded within the gasket 20. Additionally, the flange 40 defines an angled top surface 44, the function of which is described in greater detail below.

Referring to FIGS. 1 and 2, the case 12 also includes a pair of locking members 46 disposed proximate the open end 32. The locking members 46 are adapted for engagement of corresponding locking tabs 48 disposed on the cover 18 as shown, the details of which are described in greater detail below. The case 12 also comprises a plurality of sets of grooves 50 disposed along at least one of the side walls 34, which are adapted to receive a corresponding set of clamping arms 52 extending from the mounting collar 14. More specifically, the clamping arms 52 comprise projections 54 that progressively engage and positively latch into the grooves 50 to secure the case 12 to the panel 16, the details of which are described in greater detail below.

Figure 6B:
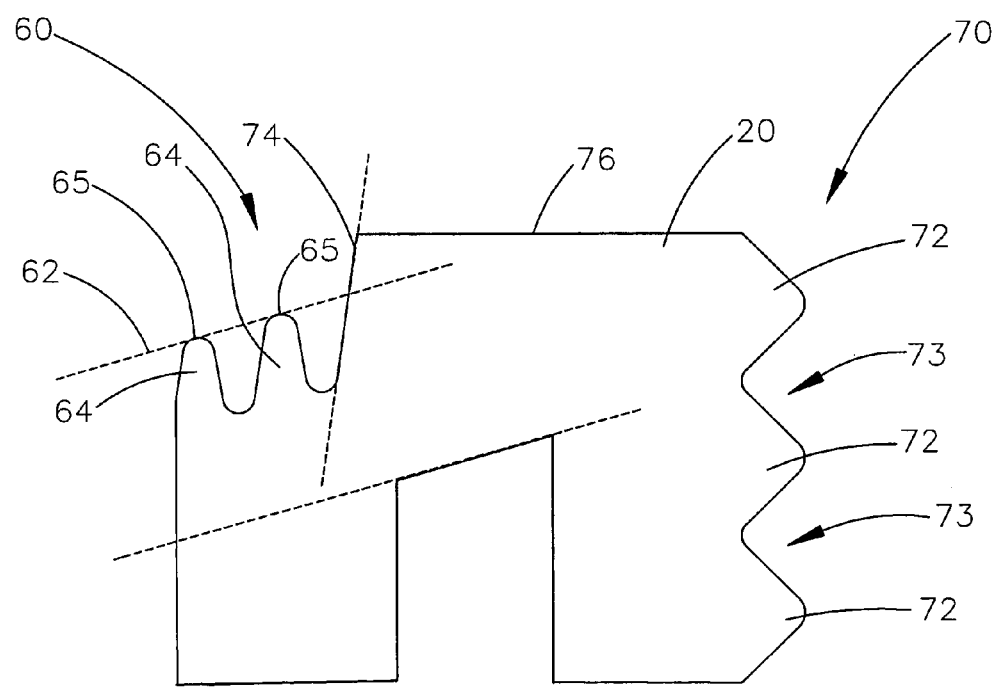
FIG. 6b is an enlarged cross-sectional view of the overall profile of a gasket constructed in accordance with the teachings of the present disclosure.

Referring now to FIGS. 6a and 6b, the gasket 20 comprises a first sealing portion 60 defining an angled profile 62, and a plurality of beads 64 disposed along the angled profile 62. The angled profile 62 is defined by ridges 65 of the beads 64, wherein as illustrated in the exemplary embodiment, a line extends across the tops of the ridges 65 to define the angled profile 62. Therefore, as used herein, the term "angled profile" shall be construed to mean a line, curve, or other spline that is generated by connecting the tops of ridges 65, (or tops of other sealing members having a different geometrical configuration than the exemplary beads 64), and extending along the first sealing portion 60, in the general mounting direction of the cover 18.

The gasket 20 further comprises a second sealing portion 70 opposed to the panel 16 as shown. The second sealing portion 70 defines a plurality of ribs 72, which are separated by a corresponding plurality of grooves 73. Preferably, both the ribs 72 and the beads 64 are continuous and extend around the entire periphery of the gasket 20. However, the ribs 72 and beads 64 may be discontinuous in certain areas in order to accommodate other features of the housing assembly 10 as described in greater detail below.

As further shown, the first sealing portion 60 comprises an angled interior wall 74 extending between one end of the beads 64 and an outer surface 76 of the gasket 20. Preferably, the angled profile 62 defines an acute angle relative to the longitudinal axis A-A (FIG. 4) of the case 12 and the angled interior wall 74 defines an angle greater than the angle of the angled profile 62 relative to the longitudinal axis A-A as shown. Additionally, the angled profile 62 of the first sealing portion 60 is substantially parallel to the top angled surface 44 of the flange 40, so that the portion of the gasket 20 located between the first sealing portion 60 and the top angled surface 44 of the flange 40 is of a relatively uniform thickness.

Generally, when the case 12 is secured to the panel 16, the ribs 72 are compressed against the panel 16 and thus provide a seal between the panel 16 and the case 12. When the cover 18 is secured to the case 12, the beads 64 are compressed against the case and thus provide a seal between the cover 18 and the interior of the case 12. Accordingly, the gasket 20 in accordance with the teachings of the present disclosure provides dual-action sealing since two separate interfaces are sealed with a single sealing member, the gasket 20. The specific details and function of each of the features of the present disclosure are now described in greater detail in the context of installing the housing assembly 10 to the panel 16.

Installation

Figure 8:
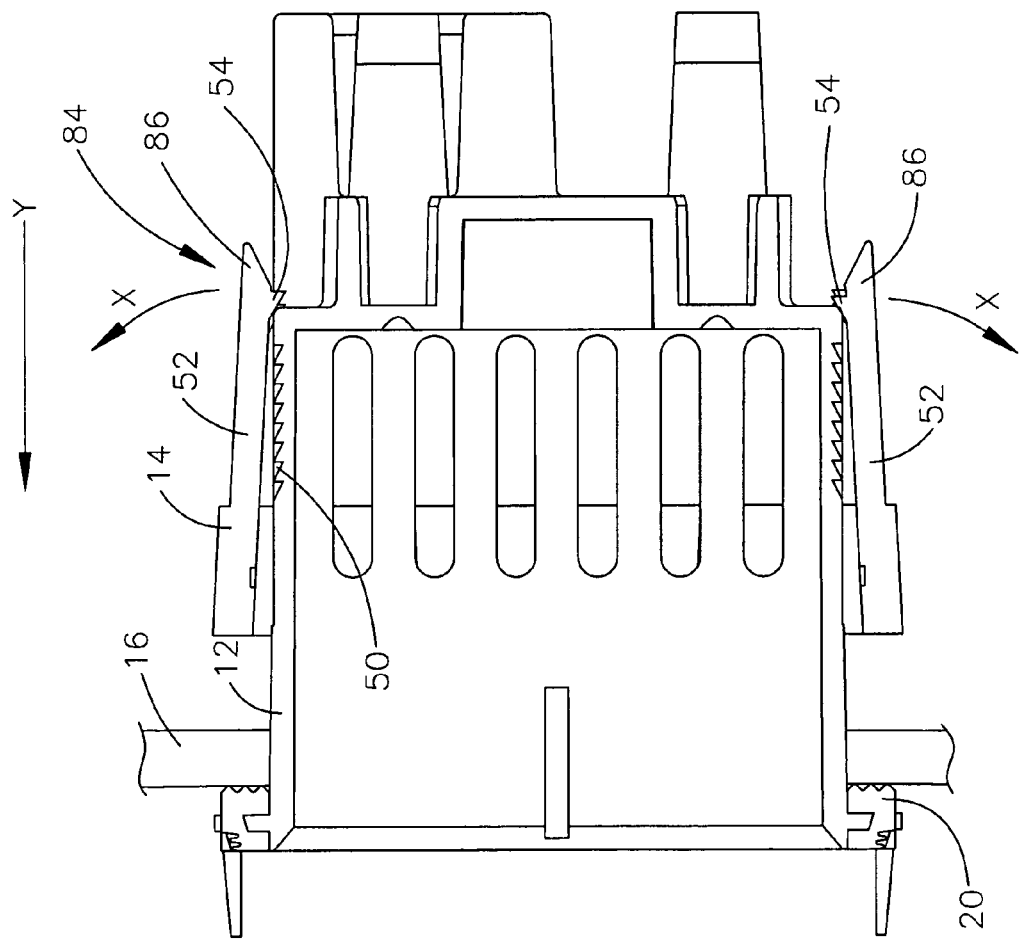
FIG. 8 is a cross-sectional view illustrating a mounting collar disposed around the case in accordance with the teachings of the present disclosure.

Referring to FIG. 7, the case 12 with the gasket 20 secured around the open end 32 is first placed within a cutout 80 of the panel 16, and the second sealing portion 70, and more specifically the ribs 72, are placed against an exterior surface 82 of the panel 16. As shown in FIG. 8, the mounting collar 14 is then placed around the case 12 such that the clamping arms 52 are aligned with the grooves 50 in the case 12. The mounting collar 14 is preferably a resilient plastic material such as a thermoplastic so that the clamping arms 52 can be flexed outwardly in the direction of arrows X as shown. Accordingly, the clamping arms 52 are biased inwardly as shown such that a clamping force is maintained when the mounting collar 14 is positively latched into place. The projections 54 are preferably disposed at end portions 84 of the clamping arms 52, and the clamping arms 52 further comprise tapered end portions 86 adjacent the projections 54. The tapered end portions 86 provide access, for either a tool or the fingers of a user, to flex the clamping arms 52 outwardly for removal of the mounting collar 14.

Figure 9:
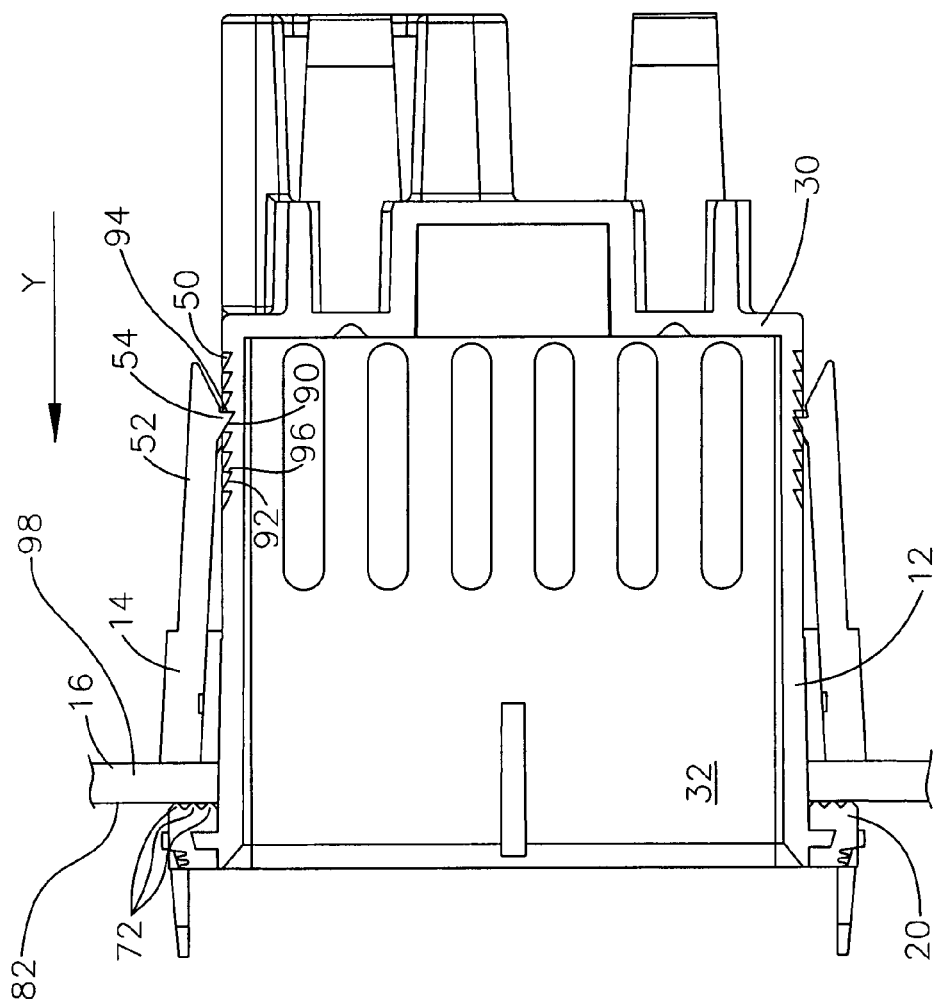
FIG. 9 is a cross-sectional view illustrating the case being secured to the panel by the mounting collar in accordance with the teachings of the present disclosure.

As shown in FIG. 9, as the mounting collar 14 is slid along the outside of the case 12 in the direction of arrow Y, towards the panel 16, the clamping arms 52 flex outwardly and the projections 54 progressively engage the grooves 50 in the case 12. More specifically, both the projections 54 and the grooves 50 define angled surfaces 90 and 92, respectively, and stops 94 and 96, respectively such that the mounting collar 14 positively latches onto the case 12 with its progressive movement towards the panel 16. Accordingly, the term "positively latched" and variations thereof shall be construed to mean that the mounting collar 14 can be freely moved in one direction while movement in an opposite direction is inhibited. With this positive latching configuration, the mounting collar 14 cannot move away from the panel 16 without each of the clamping arms 52 being deflected outwardly such that the projections 54 are completely free from the grooves 50. Accordingly, as the mounting collar 14 engages an interior surface 98 of the panel, the mounting collar 14 is capable of apply progressively higher force as the projections 54 engage successive grooves 50, which translates into progressively more compression of the ribs 72 against the exterior surface of 82 of the panel 16. Therefore, the case 12 can be securely attached to the panel 16, and with adequate compression of the ribs 72, a robust seal is provided between the panel 16 and the case 12. Additionally, with the use of clamping arms 52 and grooves 50, no separate hardware such as multiple mechanical fasteners, and in many instances corresponding washers, are required, thus providing for a much simpler installation and removal of the housing assembly 10.

Advantageously, since a plurality of grooves 50 are disposed along the case 12, a wide range panel 16 thicknesses can be accommodated. If a thicker panel 16 is used, the projections 54 would lock into the grooves 50 more towards the closed end 30 of the case 12. If a thinner panel 16 is used, the projections 54 would lock into the grooves 50 more towards the open end 32 of the case 12. Accordingly, a variety of panel thickness can easily be accommodated in accordance with the teachings of the present disclosure.

Additionally, the configuration of the second sealing portion 70 in the form of ribs 72 accommodates an exterior surface 82 that is not substantially flat or smooth around the cutout 80. For example, such a non-flat surface may result from any burrs that may be present around the cutout 80 in the case where the cutout 80 is created from the interior portion of the panel 16. Also, any other surface irregularities of the panel 16 proximate the cutout 80, such as warpage, texturing, or other undesirable surface discontinuities, can easily be compensated for by the ribs 72 and corresponding grooves 73.

Figure 10:
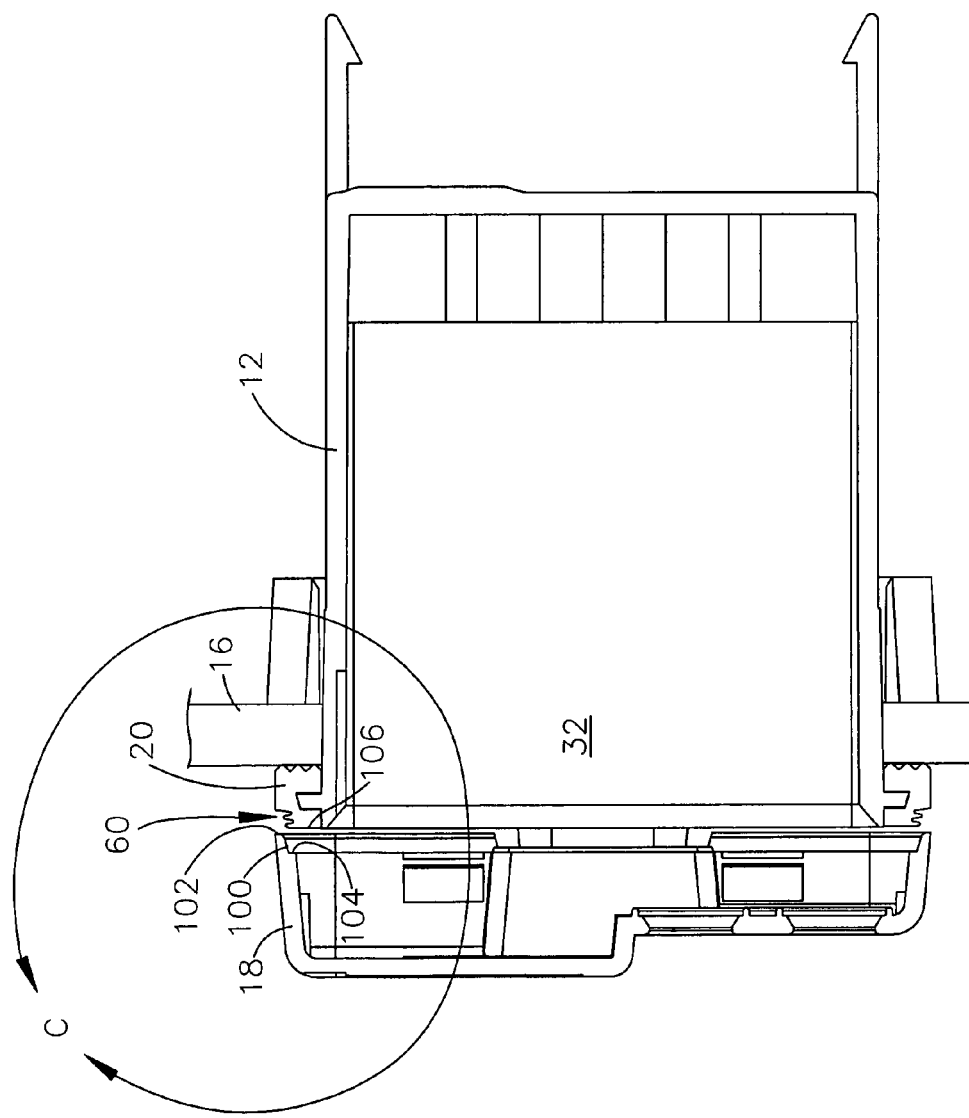
FIG. 10 is a cross-sectional view illustrating a cover positioned for placement onto the case in accordance with the teachings of the present disclosure.
Figure 11:
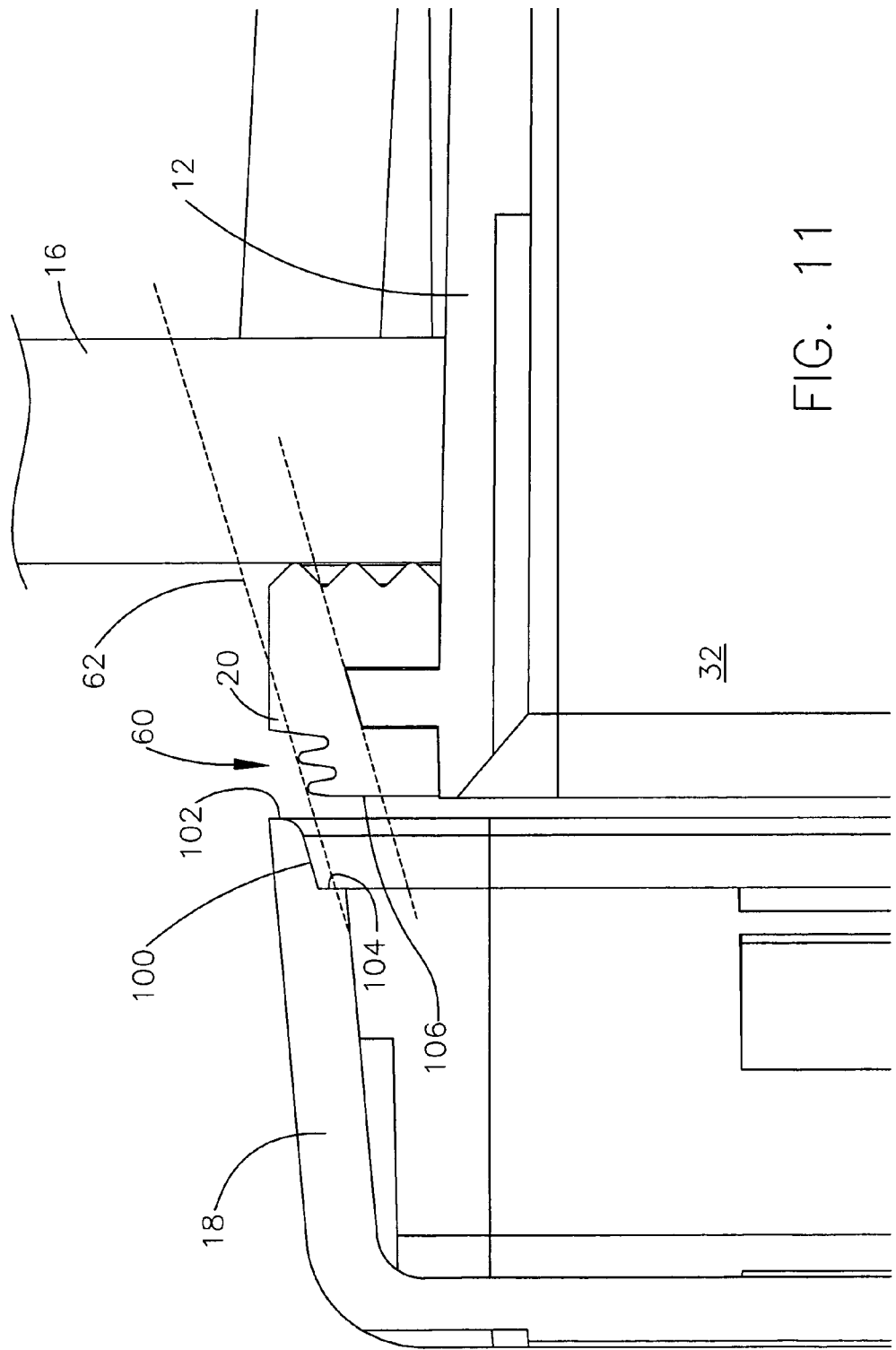
FIG. 11 is an enlarged cross-sectional view, taken from detail C of FIG. 10, illustrating the cover positioned for placement onto the case in accordance with the teachings of the present disclosure.

Referring to FIGS. 10 and 11, once the case 12 is secured to the panel 16, the cover 18 is placed proximate the open end 32 of the case 12 for installation. As shown, the cover 18 comprises an angled periphery surface 100 and an end surface 102 adapted for engagement with the first sealing portion 60 of the gasket 20. Preferably, the angled periphery surface 100 defines an angle that is substantially parallel to the angle of the angled profile 62. Additionally, the cover 18 comprises an interior wall 104 that is positioned adjacent an exterior wall 106 of the gasket 20.

Figure 12:
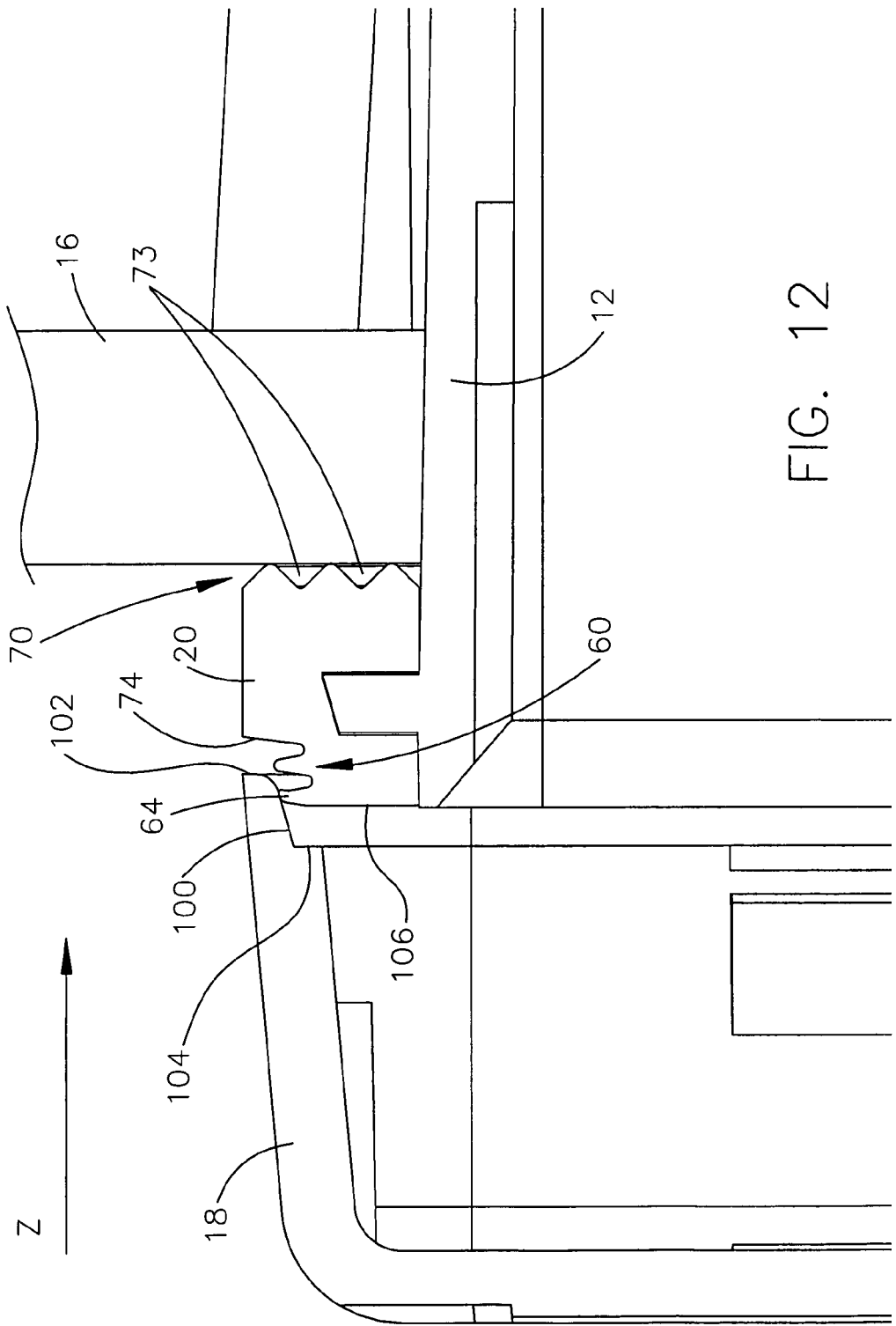
FIG. 12 is an enlarged cross-sectional view, taken from detail C of FIG. 10, illustrating the cover engaging the gasket in accordance with the teachings of the present disclosure.
Figure 13:
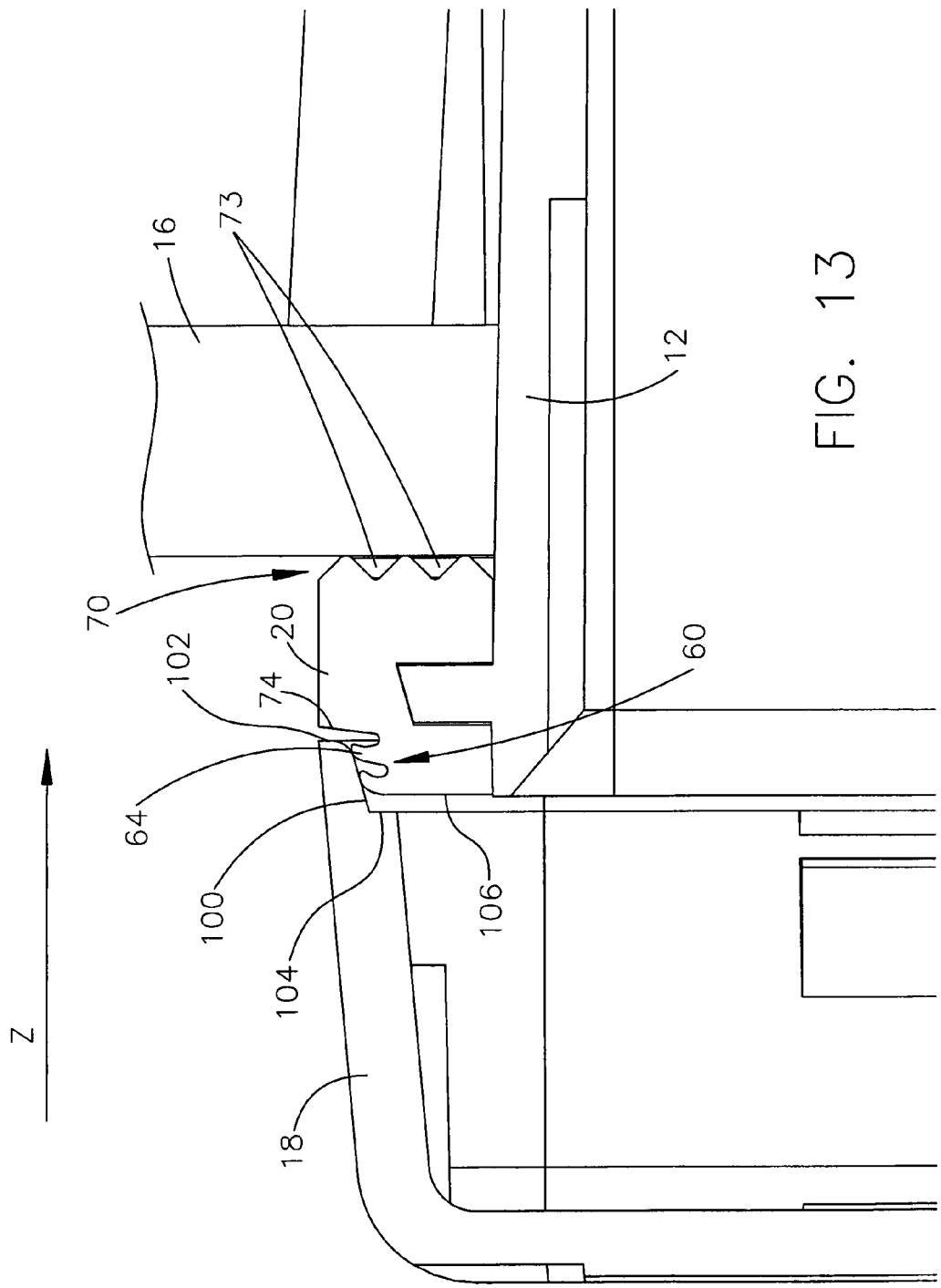
FIG. 13 is an enlarged cross-sectional view, taken from detail C of FIG. 10, illustrating the cover further engaging the gasket in accordance with the teachings of the present disclosure.
Figure 14:
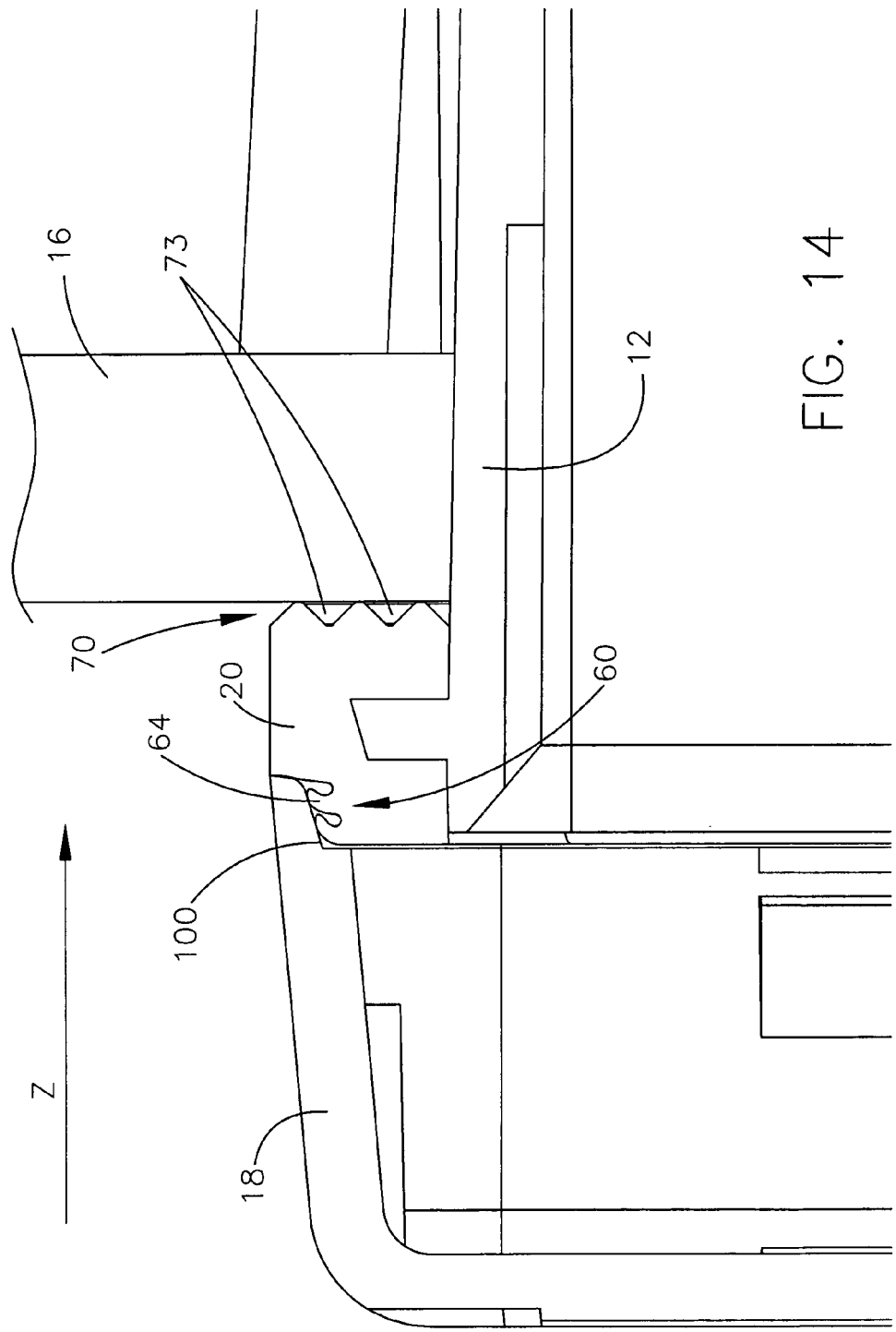
FIG. 14 is an enlarged cross-sectional view, taken from detail C of FIG. 10, illustrating the cover fully engaged with the gasket in accordance with the teachings of the present disclosure.
Figure 15:
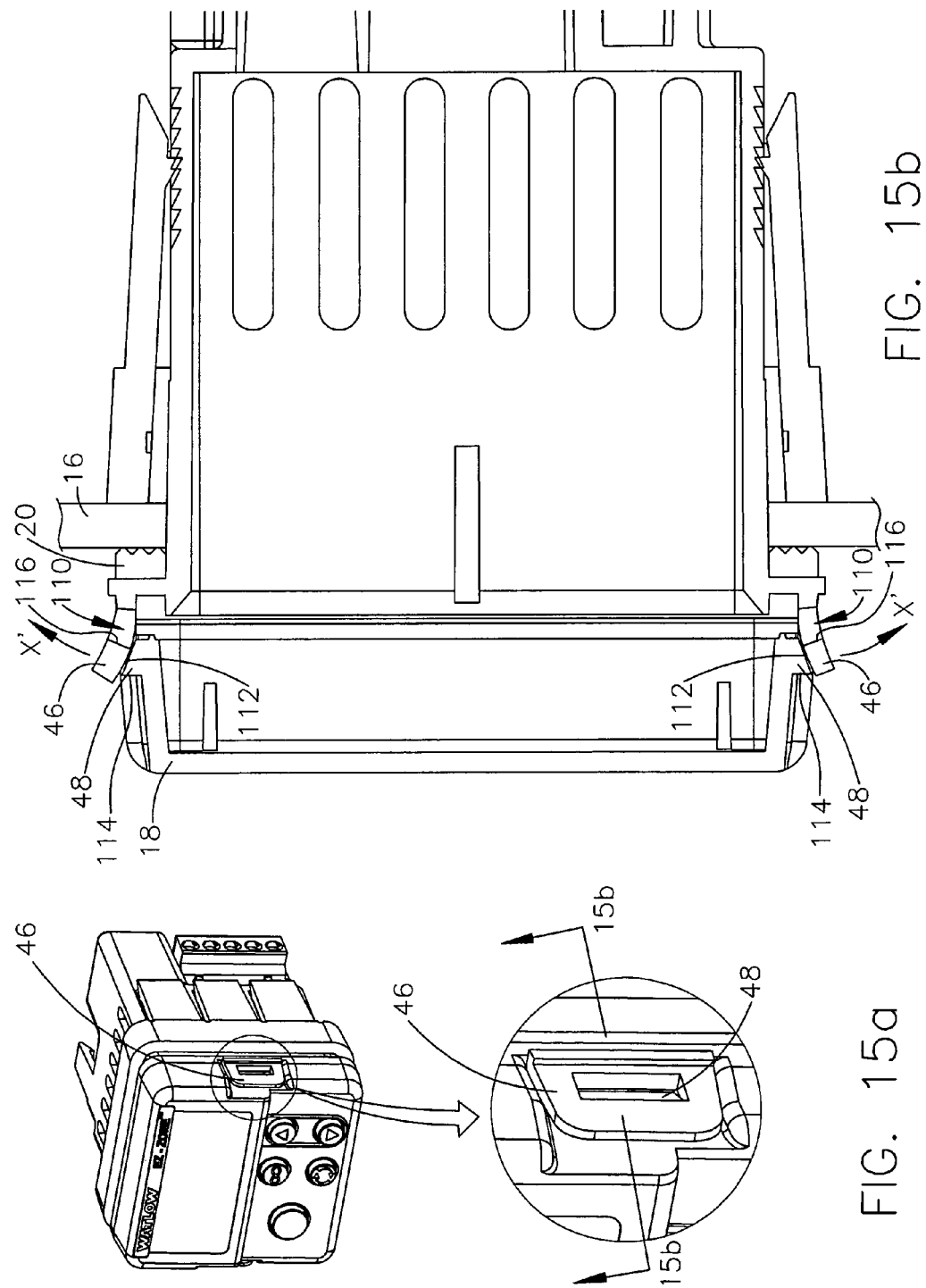
FIG. 15a is an enlarged perspective detail view of locking members of the case engaging locking tabs of the cover and constructed in accordance with the teachings of the present disclosure.
FIG. 15b is a cross sectional view, taken along line 15b-15b of FIG. 15a, illustrating locking members of the case deflected outwardly for engagement of the locking tabs of the cover in accordance with the teachings of the present disclosure.
Figure 16:
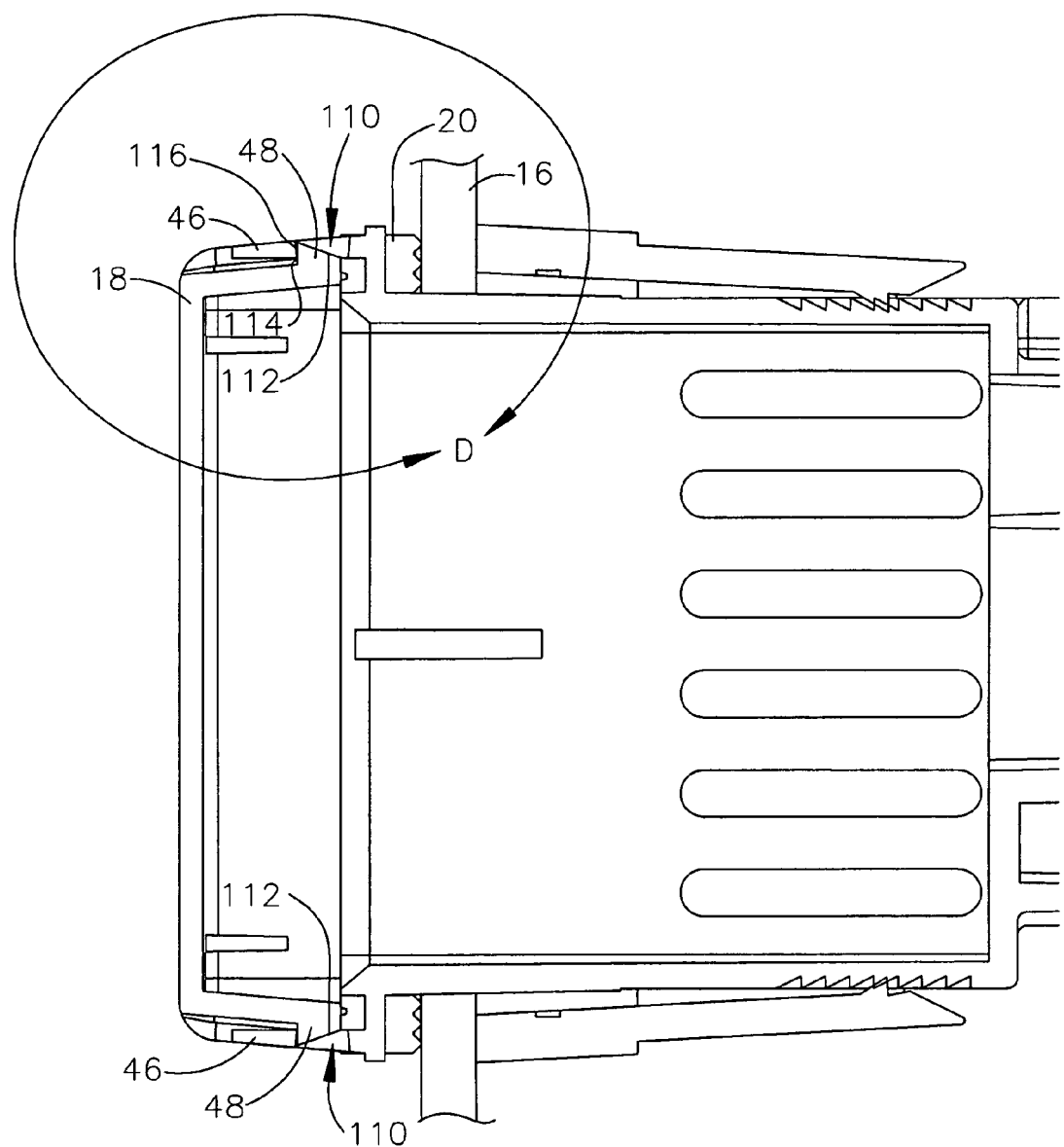
FIG. 16 is a cross sectional view illustrating the locking members fully engaged with the locking tabs in accordance with the teachings of the present disclosure.
Figure 17:
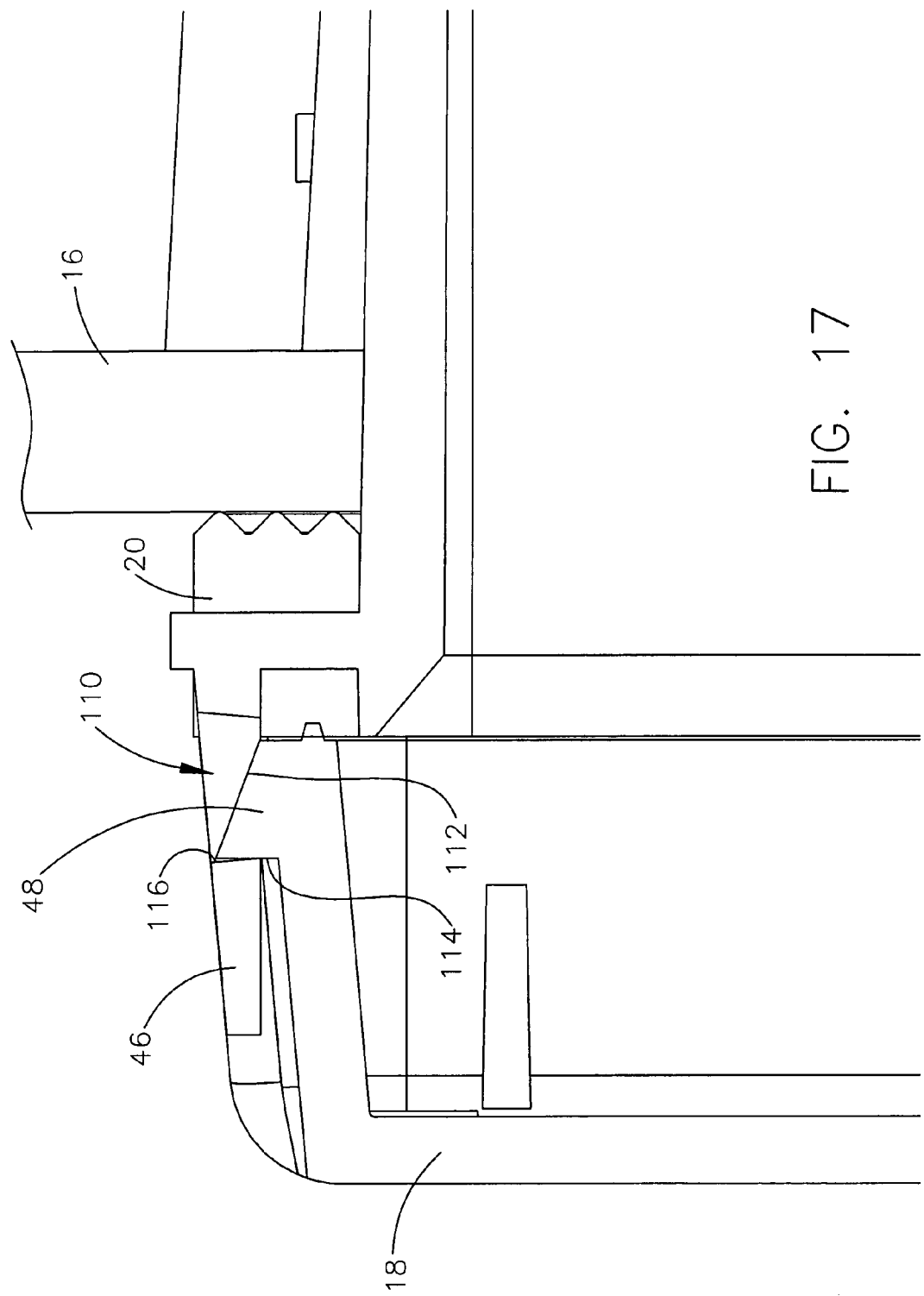
FIG. 17 is an enlarged cross sectional view, taken from detail D of FIG. 16, illustrating the locking members fully engaged with the locking tabs in accordance with the teachings of the present disclosure.

Referring now to FIGS. 12 through 14, as the cover 18 is progressively slid onto the gasket 20, the beads 64 elastically deform as shown as they are engaged by the angled periphery surface 100 of the cover 18, thus provide a seal between the cover 18 and the case 12. As the cover 18 is moved in the direction of arrow Z, towards the panel 16 in a general mounting direction, the beads 64 deform more and thus the contact area between the beads 64 and the angled periphery surface 100 increases. Also, the end surface 102 of the cover 18 engages the angled interior wall 74 of the gasket 20 as shown. In the final mated position as shown in FIG. 14, the angled profile 62 is opposed to the angled periphery surface 100 and provides a robust seal between the outside environment and the case 12.

As such, the interface between the cover 18 and the gasket 20 is sealed from outside moisture. If any outside moisture attempts to flow into this interface, the hydraulic force of the moisture forces the beads 64 against the angled periphery surface 100, thereby further improving the sealing effect along the first sealing portion 60. As any outside moisture attempts to flow into the interface between the second sealing portion 70 and the panel 16, the moisture has a tendency to become trapped within the grooves 73, thus further reducing the possibility of moisture from entering the case 12. Additionally, the shape of the beads 64 and their relatively small cross-sectional area contributes to a lower insertion force to properly secure the cover 18 to the case 12. This lower insertion force contributes to reduced stresses on the locking members 46, which are described in greater detail below.

Due to its unique dual action sealing capability, the gasket 20 has advantages over a typical o-ring or other planar sealing members. More specifically, the gasket 20 provides the first sealing portion 60 against the cover 18 and the second sealing portion 70 against the panel 16. Instead of two sealing members as conventionally required, a single gasket 20 can achieve the sealing between the case 12 and the cover 18, and also between the case 12 and the panel 16. Moreover, the provision of the plurality beads 64 and the angled interior wall 74 enables a relatively low mounting force to achieve an effective seal. The unique construction of the gasket 20 further improves sealing between the cover 18 and the gasket 20 when a hydraulic force is applied to the gasket 20 due to the unique orientation and configuration of the beads 64.

After the cover 18 is properly installed onto the gasket 20, the cover is locked into place with the locking members 46 as previously described. As shown in FIGS. 15a through 17, the locking members 46 comprise cutouts 110 that are engaged by the locking tabs 48 to secure the cover 18 to the case 12. Accordingly, the locking members 46 are preferably a resilient plastic material such that the locking members 46 can be flexed outwardly in the direction of arrows X' as shown. Since the locking tabs 48 define angled surfaces 112, the cover 18 can be snapped into place as the angled surfaces 112 force the locking members 46 outwardly until the locking tabs 48 are positioned within the cutouts 110. In this position, a shoulder 114 disposed along the locking tabs 48 engages an interior surface 116 of a cutout 110 to lock the cover 18 into place. For removal of the cover 18, the locking tabs 48 are flexed outwardly until the locking tabs 48 are free from the cutouts 110, and the cover 18 is then pulled away from the gasket 20. Accordingly, the cover 18 also include a positive latching configuration in accordance with the teachings of the present disclosure.

Figure 18:
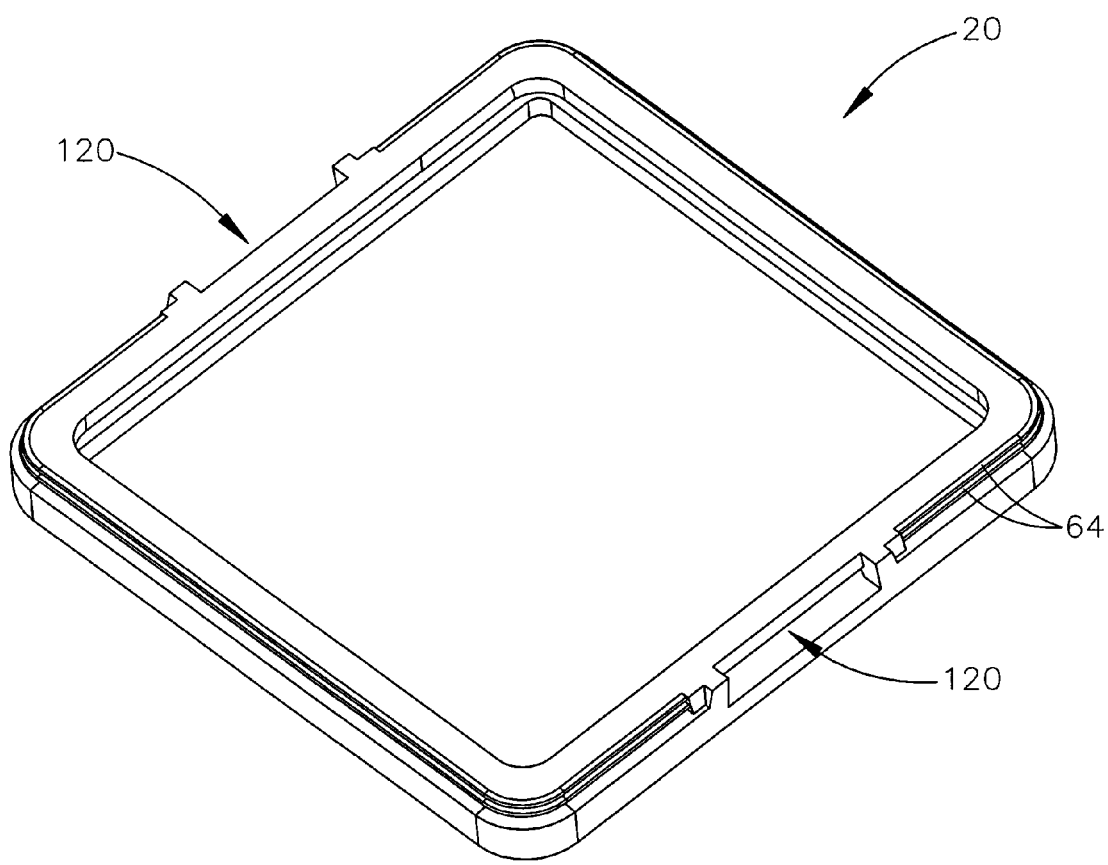
FIG. 18 is a perspective view of a gasket constructed in accordance with the teachings of the present disclosure.
Figure 19:
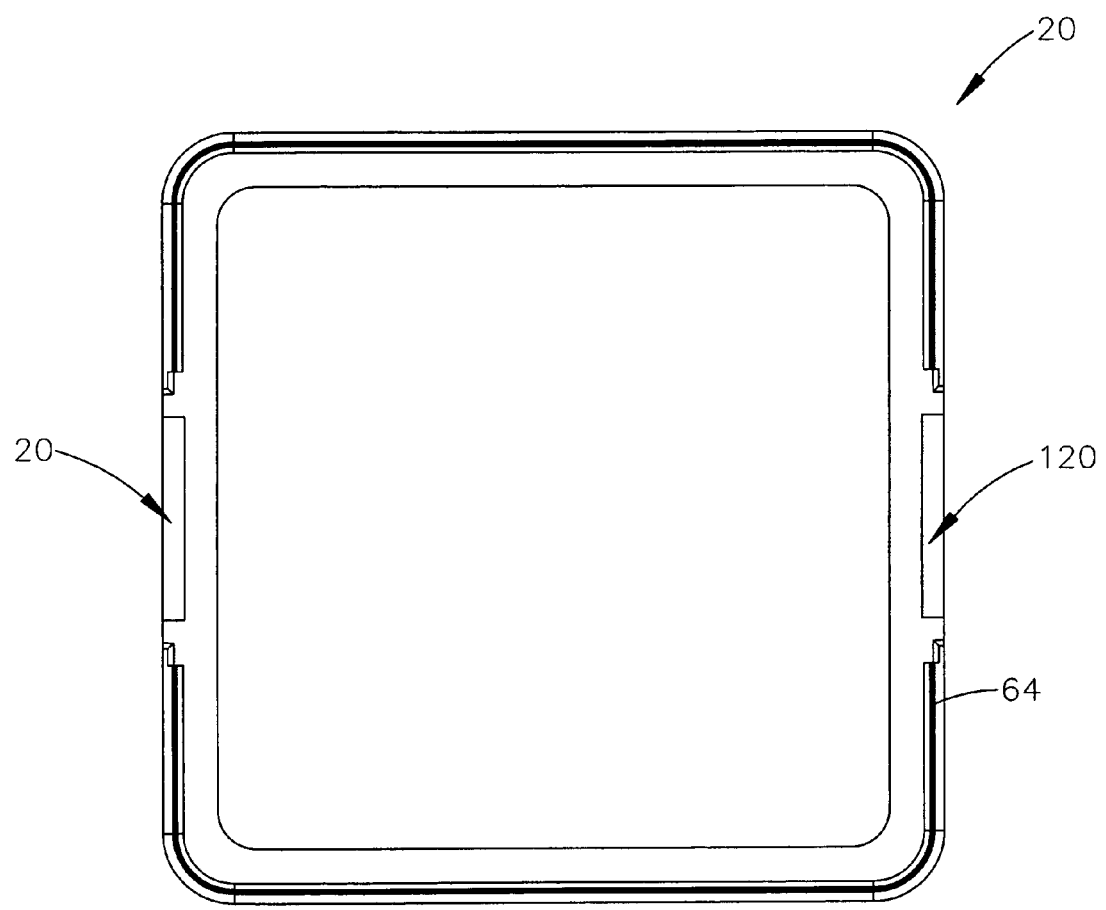
FIG. 19 is a top view of the gasket in accordance with the teachings of the present disclosure.
Figure 20:
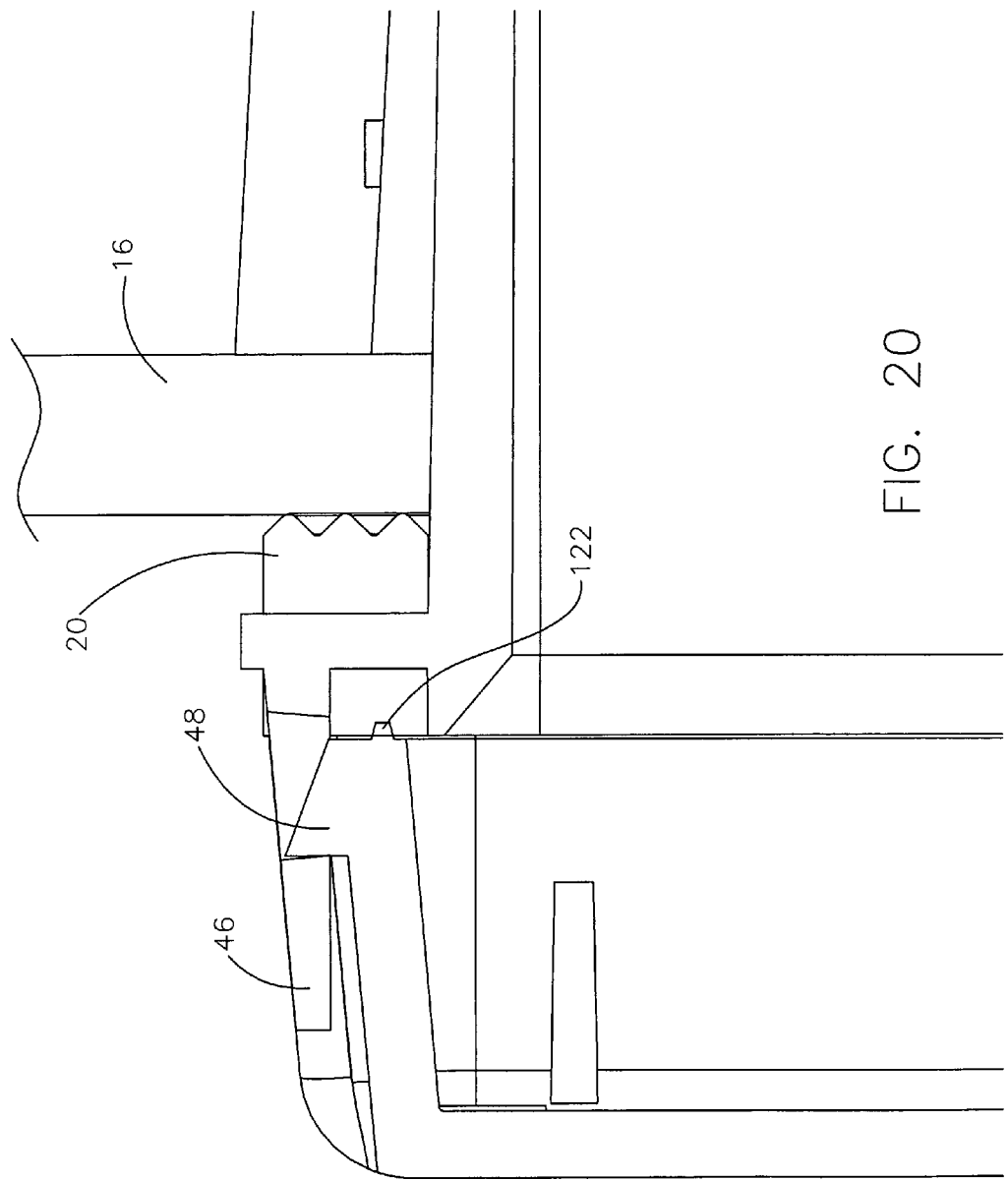
FIG. 20 is an enlarged cross-sectional view of a locking member proximate a recessed portion of the gasket in accordance with the teachings of the present disclosure.

Referring now to FIGS. 18 through 20, the gasket 20 further comprises recessed portions 120 to accommodate the locking members 46. In one form of the present invention, the beads 64 do not extend along the recessed portions 120 as shown, in order to reduce the amount of force required to fully engage the locking tabs 48 within the locking members 46. Accordingly, the cover 18 comprises ridges 122 (FIG. 20) disposed along an end portion of the locking tabs 48 to engage the gasket 20 and provide for an improved seal.

Figure 21:
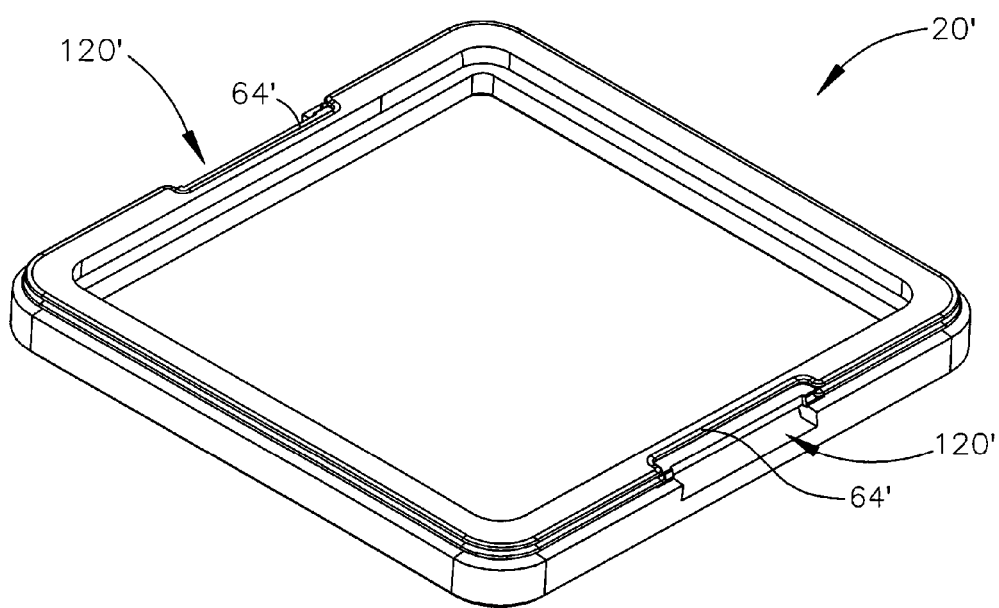
FIG. 21 is a perspective view of a second embodiment of a gasket constructed in accordance with the teachings of the present disclosure.
Figure 22:
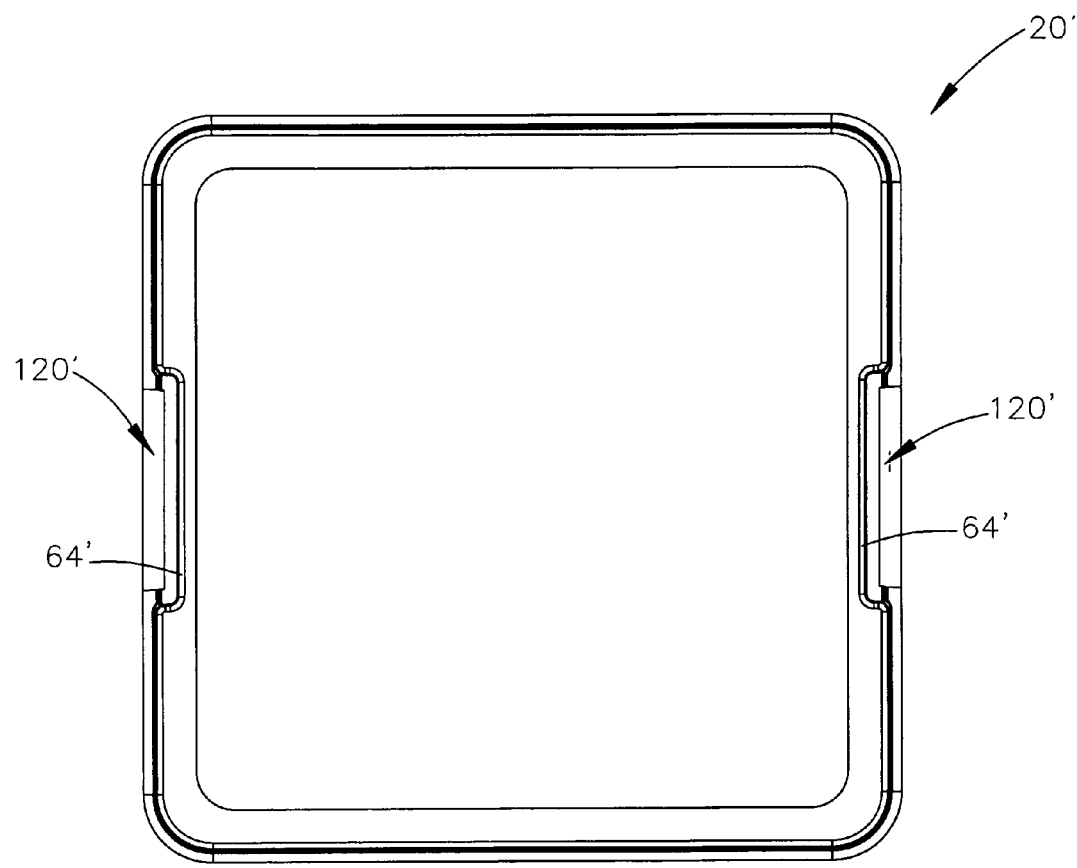
FIG. 22 is a top view of the second gasket in accordance with the teachings of the present disclosure.
Figure 23:
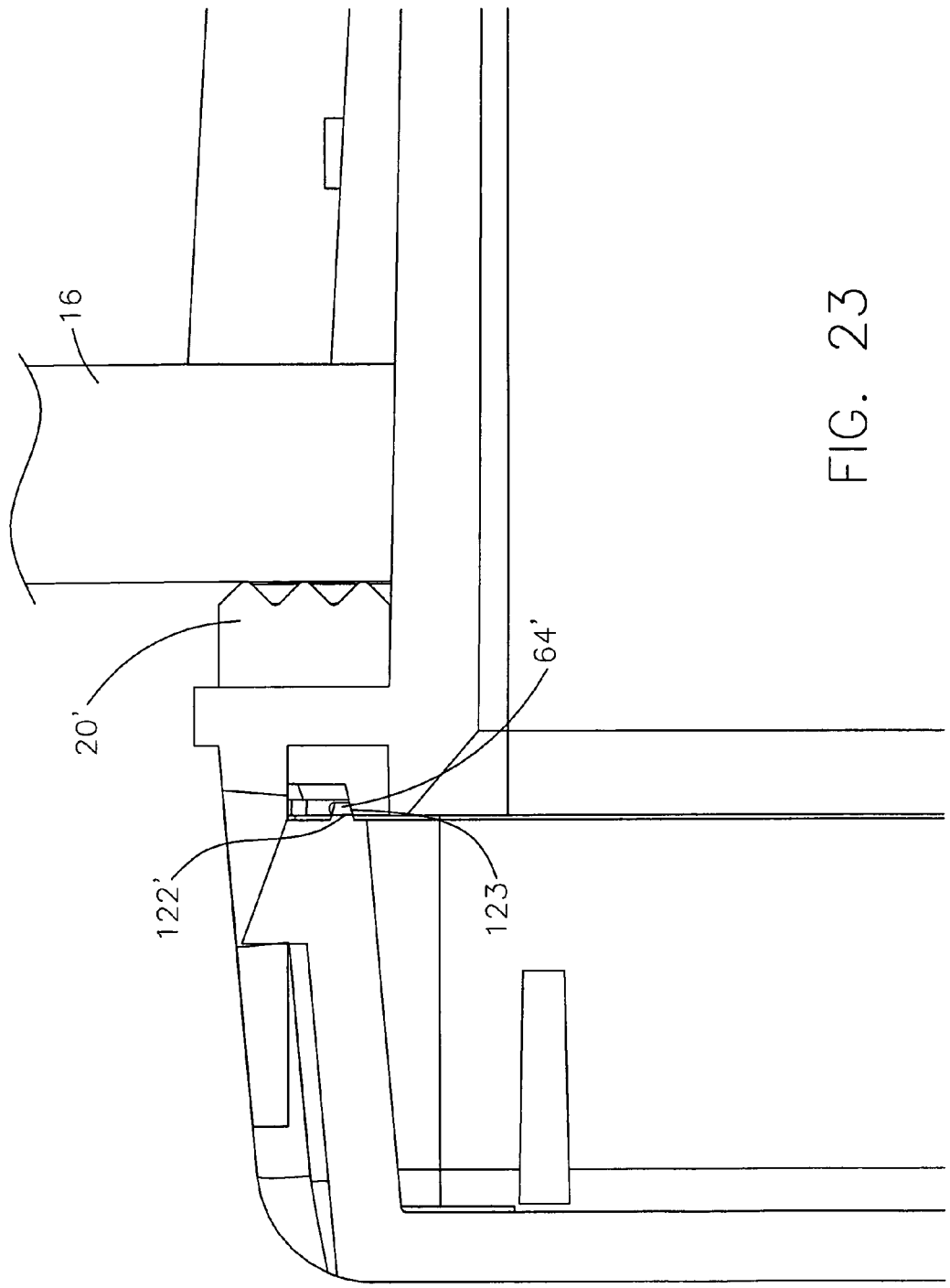
FIG. 23 is an enlarged cross-sectional view of a locking member proximate a recessed portion of the second gasket in accordance with the teachings of the present disclosure.

Alternately, as shown in FIGS. 21 through 23, the gasket 20' includes only one of the beads 64' extending along the recessed portions 120'. With one bead 64', the amount of force required to fully engage the locking tabs 48 is still reduced while maintaining an improved seal between the locking members 46 and the case 12. Additionally, the ridge 122' engages the bead 64', and as such defines an angled surface 123, similar to the angled periphery surface 100 of the cover 18, to provide a robust seal as previously described.

Figure 24:
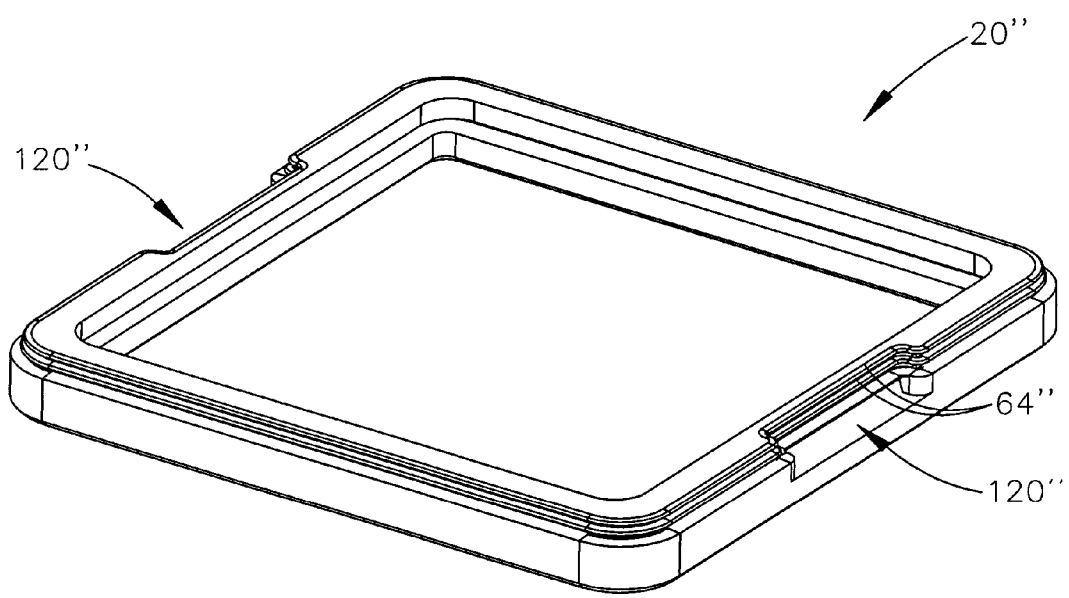
FIG. 24 is a perspective view of a third embodiment of a gasket constructed in accordance with the teachings of the present disclosure.
Figure 25:
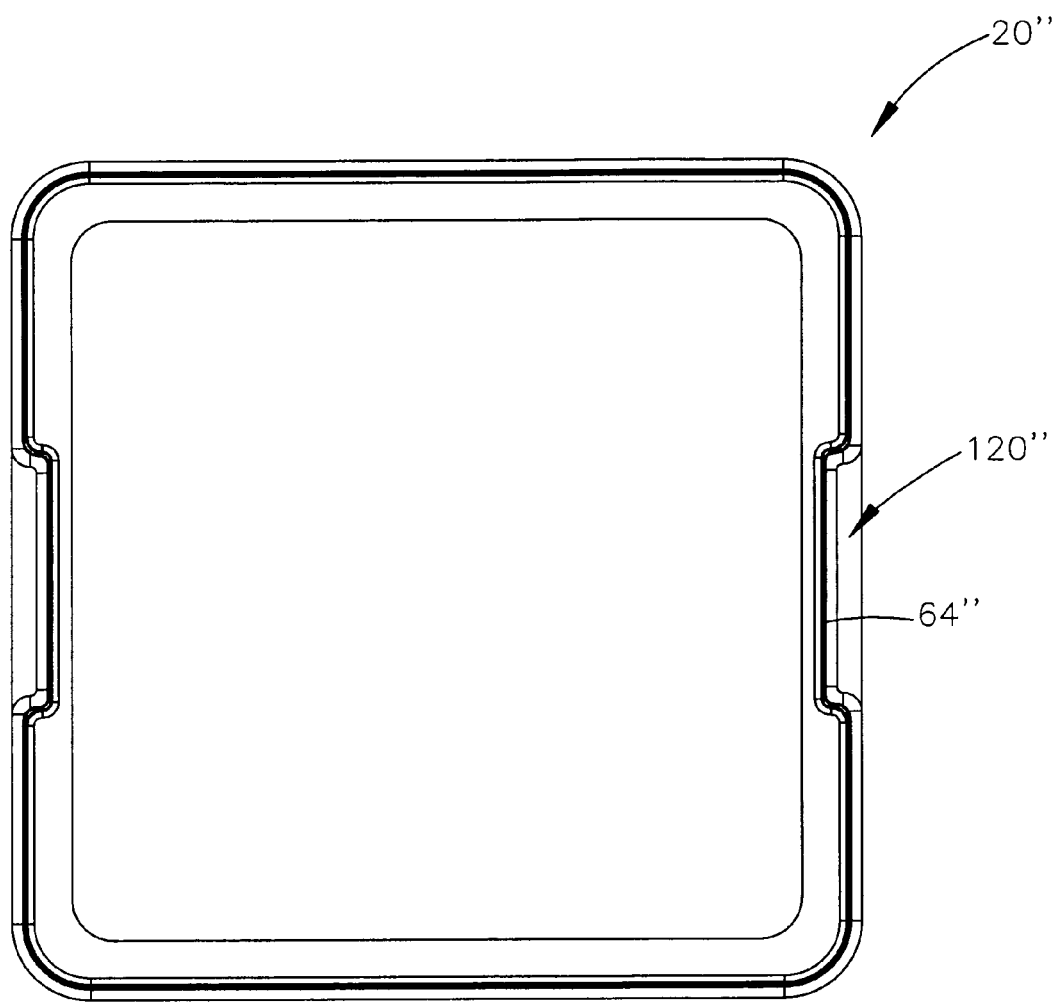
FIG. 25 is a top view of the third gasket in accordance with the teachings of the present disclosure.
Figure 26:
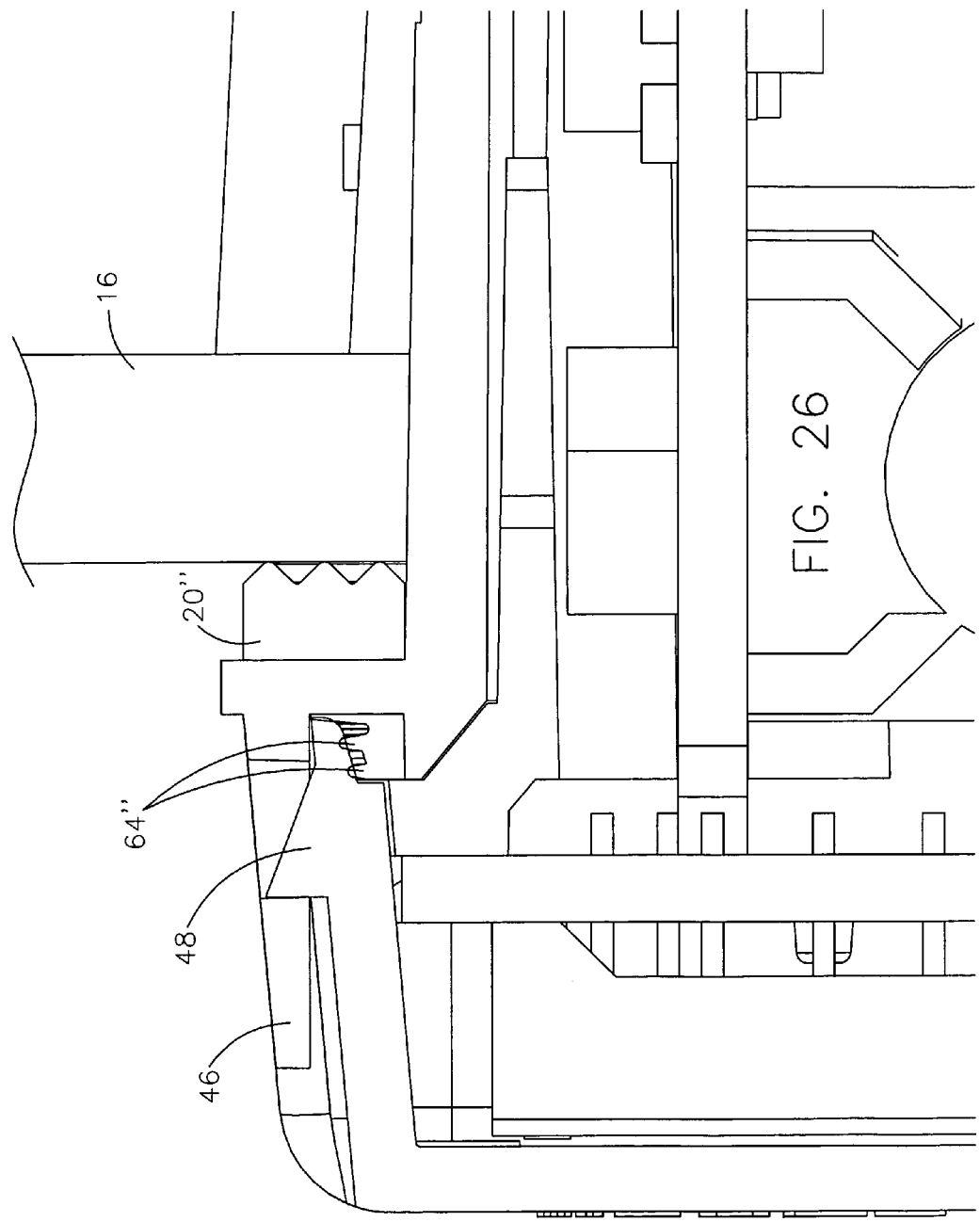
FIG. 26 is an enlarged cross-sectional view of a locking member proximate a recessed portion of the third gasket in accordance with the teachings of the present disclosure.

In yet another form of the gasket 20" as shown in FIGS. 24 through 26, both of the beads 64" extend along the recessed portions 120". While the amount of force required to fully engage the locking tabs 48 is increased, the presence of two beads 64" improves the seal between the locking members 46 and the case 12.

Figure 27:
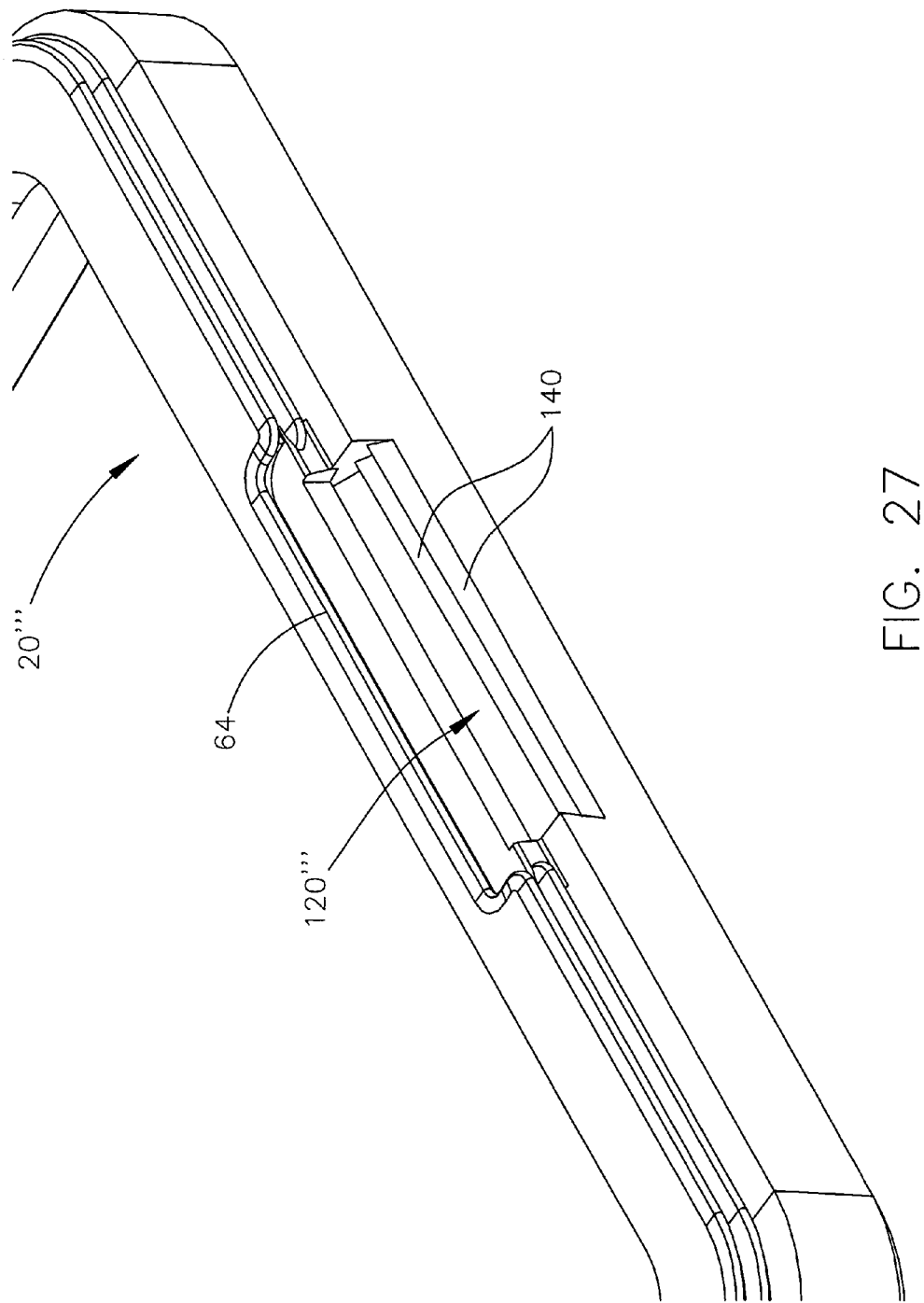
FIG. 27 is an enlarged perspective view of a fourth embodiment of a gasket constructed in accordance with the teachings of the present disclosure.

Referring to FIG. 27, another form of the gasket 20''' is illustrated, wherein the recessed portions 120''' comprise ribs 140 extending along the recessed portions 120''' as shown. The ribs 140 are configured similar to the ribs 72 along the second sealing portion 70 as previously described and are employed to provide an improved sealing interface between the locking tabs 48 and the case 12. The ribs 140 may be employed with or without the beads 64 extending along the recessed portion 120''', and the illustration of only one bead 64 should not be construed as limiting the scope of the present invention. Additionally, more or fewer ribs 140 may be employed along any surface of the recessed portion 120''' while remaining within the scope of the present invention, and as such, the illustration of two (2) ribs 140 extending along a lower surface of the recessed portion 120''' is merely exemplary and should not be construed as limiting the scope of the present invention.

Referring back to FIGS. 2 and 4, the gasket 20 is preferably a single-piece and extends around the entire periphery of the open end 32 of the case 12. The gasket 20 is preferably chemically fused to the case 12 in a molding process, e.g., two-shot injection molding, although a separate gasket 20 may be installed onto the flange 40 while remaining within the scope of the present invention. Preferably, the case 12 is a polycarbonate material such as Lexan®, and the gasket 20 is a thermoplastic elastomer such as Santoprene®. As such, the thermoplastic elastomer gasket 20 is specifically formulated to chemically fuse to the polycarbonate case 12. However, these materials are exemplary only and it should be understood that other materials may be employed for the case 12 and the gasket 20 while remaining within the scope of the present invention.

Additionally, although two (2) beads 64 and three (3) ribs 72 are illustrated in one form of the present invention, it should be understood that more or less of each of the beads 64 and the ribs 72 may be employed while remaining within the scope of the present invention.

Figure 28:
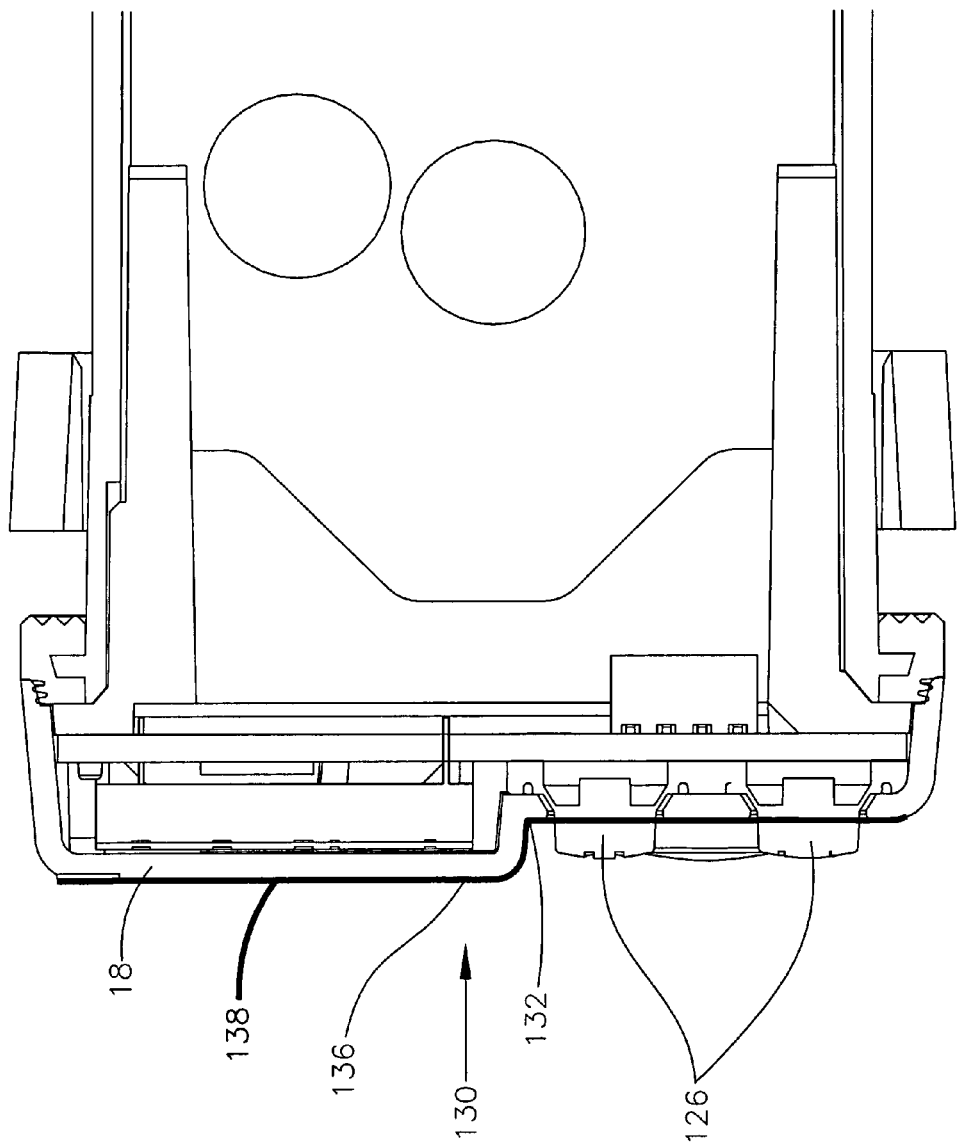
FIG. 28 is a cross-sectional view illustrating a raised surface of the cover constructed in accordance with the teachings of the present disclosure.

Referring now to FIG. 28, the present invention also provides protection for the inadvertent engagement of user interface buttons 126 during operation of the housing assembly 10. (The user interface buttons 126 are also shown in greater detail in FIGS. 1 and 3). As shown, the cover 18 further comprises a front face 130 having a first surface 132 through which the user interface buttons 126 are disposed and a raised surface 136 disposed adjacent the first surface 132. Accordingly, front face 130 of the cover 18 defines a profile 138 such that the raised surface 136 provides a barrier against accidental engagement of the user interface buttons 134 since the user interface buttons 134 are recessed relative to the raised surface 136.

The present disclosure is merely exemplary in nature and, thus, variations that do not depart from the gist of the present disclosure are intended to be within the scope of the present disclosure. Such variations are not to be regarded as a departure from the spirit and scope of the present disclosure.

What is claimed is:

1. A housing assembly comprising:
   a case having an open end; and
   a gasket secured to the case proximate the open end, the gasket comprising:

a first sealing portion defining an angled profile and a plurality of beads disposed along the angled profile; and a second sealing portion defining a plurality of ribs, the second sealing portion being disposed transversely to the first sealing portion.

2. The housing assembly according to claim 1, wherein the angled profile of the first sealing portion defines an acute angle relative to a longitudinal centerline of the case.

3. The housing assembly according to claim 1, wherein the plurality of beads are elastically deformable.

4. The housing assembly according to claim 1, wherein the case further comprises a flange disposed around the open end, and the gasket is secured to the flange.

5. The housing assembly according to claim 4, wherein the flange defines an angled top surface which is substantially parallel to an angle of the angled profile.

6. The housing assembly according to claim 1, wherein the gasket is a single-piece.

7. The housing assembly according to claim 1, wherein the case further comprises at least one locking member for securing a cover to the case proximate the open end.

8. The housing assembly according to claim 7, wherein the gasket further comprises at least one recessed portion for receiving the locking member.

9. The housing assembly according to claim 8, wherein the case comprises two opposed locking members and the gasket comprises a corresponding two recessed portions.

10. The housing assembly according to claim 1, wherein the gasket and the case define a shape selected from a group consisting of square, rectangular, circular, elliptical, and polygonal.

11. The housing assembly according to claim 1, wherein the plurality of beads are continuous around the first sealing portion.

12. The housing assembly according to claim 1, wherein the plurality of ribs are continuous around the second sealing portion.

13. The housing assembly according to claim 1, wherein the gasket is chemically fused to the case.

14. The housing assembly according to claim 1, wherein the gasket and the case comprise a thermoplastic material.

15. The housing assembly according to claim 14, wherein the gasket is a thermoplastic elastomer.

16. The housing assembly according to claim 14, wherein the thermoplastic material of the case is a polycarbonate.

17. A housing assembly comprising:
a case having an open end;
a cover for closing the open end of the case, the cover including an angled periphery surface;
a mounting collar disposed around the case for mounting the case to a panel; and
a gasket secured to the case proximate the open end, the gasket comprising:
a first sealing portion opposed to the angled periphery surface of the cover, the first sealing portion defining an angled profile and a plurality of beads disposed along the angled profile; and
a second sealing portion opposed to the panel and defining a plurality of ribs,
wherein when the cover is mounted to the open end of the case, the plurality of beads are elastically deformed by the angled periphery surface of the cover and the plurality of ribs are compressed against the panel.

18. The housing assembly according to claim 17, wherein the mounting collar comprises a plurality of clamping arms defining a corresponding plurality of projections and the case comprises a corresponding plurality of grooves, wherein the projections of the clamping arms engage the grooves to positively latch the case to the panel.

19. The housing assembly according to claim 17, wherein the case further comprises at least one locking member and the cover comprises at least one corresponding locking tab, wherein the locking member engages the locking tab to secure the cover to the case.

20. The housing assembly according to claim 17, wherein the cover comprises a front face, the front face comprising:
a first surface through which at least one user interface button is disposed; and
a raised surface disposed adjacent the first surface such that the user interface button is recessed relative to the raised surface,
wherein the raised surface provides a barrier against accidental engagement of the user interface button.

21. The housing assembly according to claim 17, wherein the cover further comprises an end surface disposed adjacent the angled periphery surface, wherein the end surface engages the first sealing portion of the gasket.

22. The housing assembly according to claim 21, wherein the first sealing portion further comprises an angled interior wall disposed adjacent the plurality of beads, and the end surface of the cover engages the angled interior wall of the gasket.

23. The housing assembly according to claim 17, wherein the case further comprises a flange disposed around the open end, the gasket being mounted to the flange, the flange defining an angled top surface which is substantially parallel to an angle of the angled profile.

24. The housing assembly according to claim 17, wherein the angled periphery surface is substantially parallel to an angle of the angled profile.

25. A gasket comprising:
a first sealing portion defining an angled profile;
a second sealing portion disposed transversely to the first sealing portion;
a plurality of beads disposed along the angled profile of the first sealing portion;
a plurality of ribs disposed along the second sealing portion; and
at least one recessed portion for receiving a locking member of an adjacent component.

26. The gasket according to claim 25, wherein the plurality of beads extend along the recessed portion.

27. The gasket according to claim 25, wherein only one of the plurality of beads extends along the recessed portion.

28. The gasket according to claim 25, wherein the plurality of beads do not extend along the recessed portion.

29. The gasket according to claim 25 comprising two beads and three ribs.

30. The gasket according to claim 25 further comprising ribs extending along the recessed portion.

31. The gasket according to claim 25, wherein the first sealing portion further comprises an angled interior wall disposed adjacent the plurality of beads, wherein the angled interior wall defines an angle greater than an angle of the angled profile relative to a longitudinal centerline of the gasket.

32. A housing assembly comprising:
a case having an open end;
a cover for closing the open end of the case, the cover including an angled periphery surface; and
a gasket secured to the case proximate the open end, the gasket comprising:

a first sealing portion defining at least one bead adapted for engagement with the angled periphery surface of the cover; and a second sealing portion defining at least one rib, wherein when the cover is mounted to the open end of the case, the at least one bead is elastically deformed by the angled periphery surface of the cover along an angled profile and the at least one rib is compressed against a panel.

* * * * *